United States Patent [19]

Uhtenwoldt

[11] Patent Number: 4,599,786
[45] Date of Patent: Jul. 15, 1986

[54] GRINDING MACHINE WITH APPARATUS FOR CHANGING GRINDING WHEEL TOOLS AND WORKPIECES

[75] Inventor: Herbert R. Uhtenwoldt, Worcester, Mass.

[73] Assignee: Cincinnati Milacron Inc., Cincinnati, Ohio

[21] Appl. No.: 647,314

[22] Filed: Sep. 4, 1984

[51] Int. Cl.⁴ .......................................... B23Q 3/156
[52] U.S. Cl. ................................................... 29/568
[58] Field of Search ................. 29/568, 26 A; 408/35; 414/225, 222, 223

[56] References Cited

U.S. PATENT DOCUMENTS

| | | | |
|---|---|---|---|
| 4,065,988 | 1/1978 | Lohneis | 29/568 X |
| 4,359,815 | 11/1982 | Toyoda | 29/568 |
| 4,369,563 | 1/1983 | Williamson | 29/568 |
| 4,439,090 | 3/1984 | Schaefer | 414/736 |
| 4,528,743 | 7/1985 | Bleich | 29/568 |

FOREIGN PATENT DOCUMENTS

| | | | |
|---|---|---|---|
| 88645 | 9/1983 | European Pat. Off. | 29/568 |
| 137901 | 10/1979 | Fed. Rep. of Germany | 29/568 |
| 1283584 | 7/1972 | United Kingdom | 29/568 |
| 2008991 | 6/1979 | United Kingdom | 414/225 |
| 623707 | 9/1978 | U.S.S.R. | 29/563 |

Primary Examiner—William R. Briggs
Attorney, Agent, or Firm—Thomas M. Farrell

[57] ABSTRACT

A grinding machine utilizes a gantry type loader for exchanging workpieces with the work support spindle of the machine. The loading head of the gantry loader has a rotatable workpiece gripper assembly to switch the parts end-for-end during the loading and unloading process. The loading head is also fitted with nonrotating workpiece grippers which are spring biased to mechanically grip and extract a grinding wheel tool from a grinding wheelhead and exchange the tool with a different tool located in a tool support pocket of a tool storage matrix at a position remote from the grinding wheel head.

1 Claim, 43 Drawing Figures

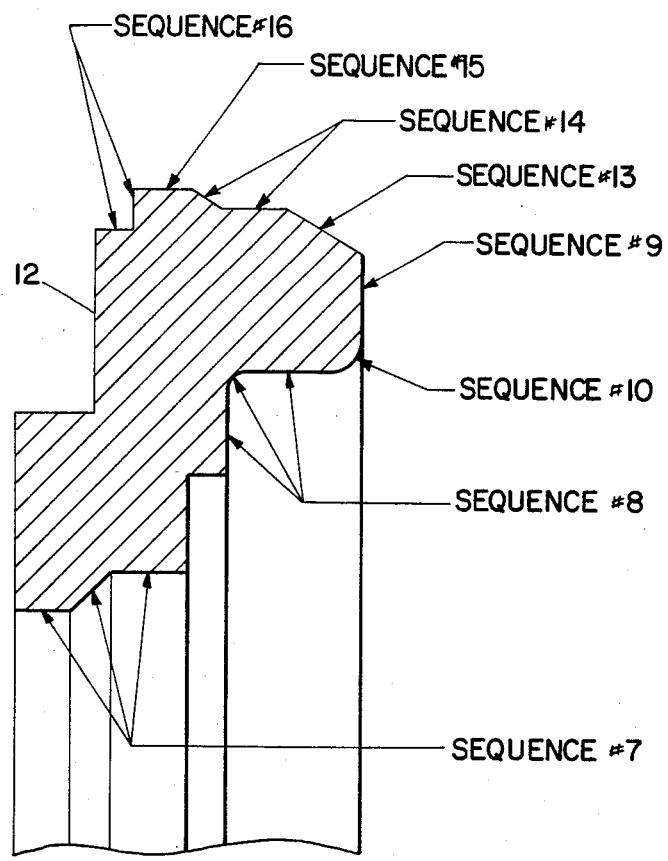

SEQUENCES OF GRINDING OPERATIONS

SEQUENCE #7: I.D. PLUNGE GRIND OPERATION
SEQUENCE #8: I.D. VECTOR GRIND OPERATION
SEQUENCE #9: I.D. FACE RECIP. GRIND OPERATION
SEQUENCE #10: I.D. RADIUS GENERATION OPERATION
SEQUENCE #13: O.D. VECTOR RECIP. GRIND OPERATION
SEQUENCE #14: O.D. DIAMETER PLUNGE GRIND OPERATION
SEQUENCE #15: O.D. DIAMETER RECIP. GRIND OPERATION
SEQUENCE #16: O.D. REVERSE VECTOR GRIND OPERATION

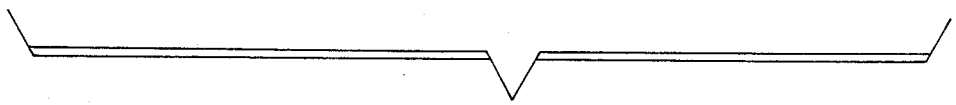

*Fig. 25*

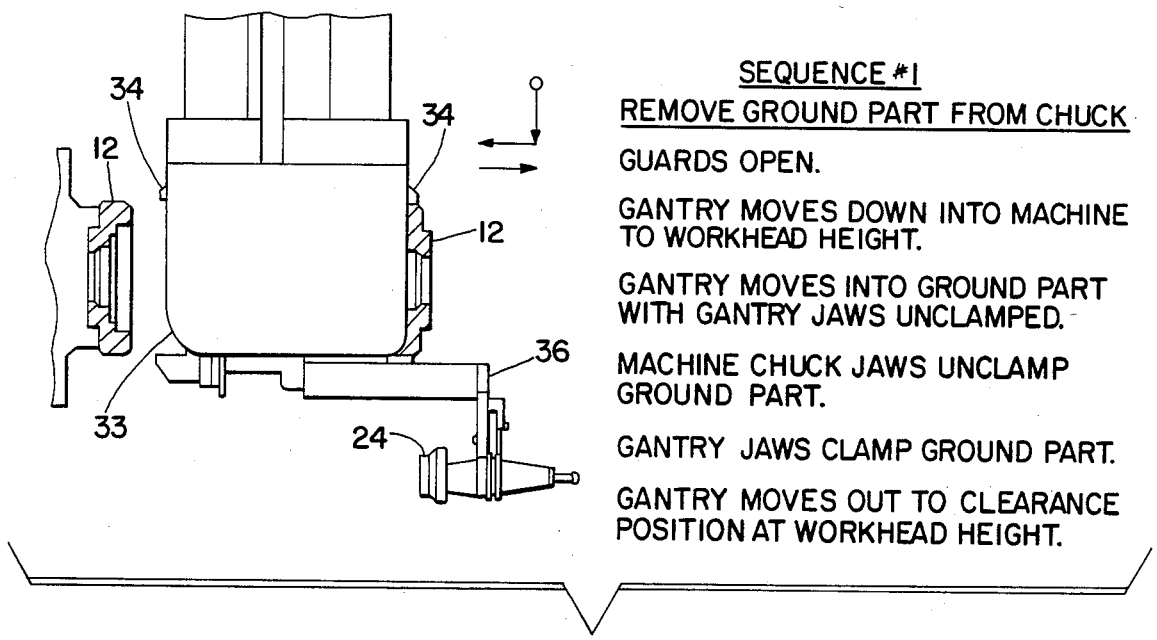

SEQUENCE #1
REMOVE GROUND PART FROM CHUCK

GUARDS OPEN.

GANTRY MOVES DOWN INTO MACHINE TO WORKHEAD HEIGHT.

GANTRY MOVES INTO GROUND PART WITH GANTRY JAWS UNCLAMPED.

MACHINE CHUCK JAWS UNCLAMP GROUND PART.

GANTRY JAWS CLAMP GROUND PART.

GANTRY MOVES OUT TO CLEARANCE POSITION AT WORKHEAD HEIGHT.

*Fig. 26a*

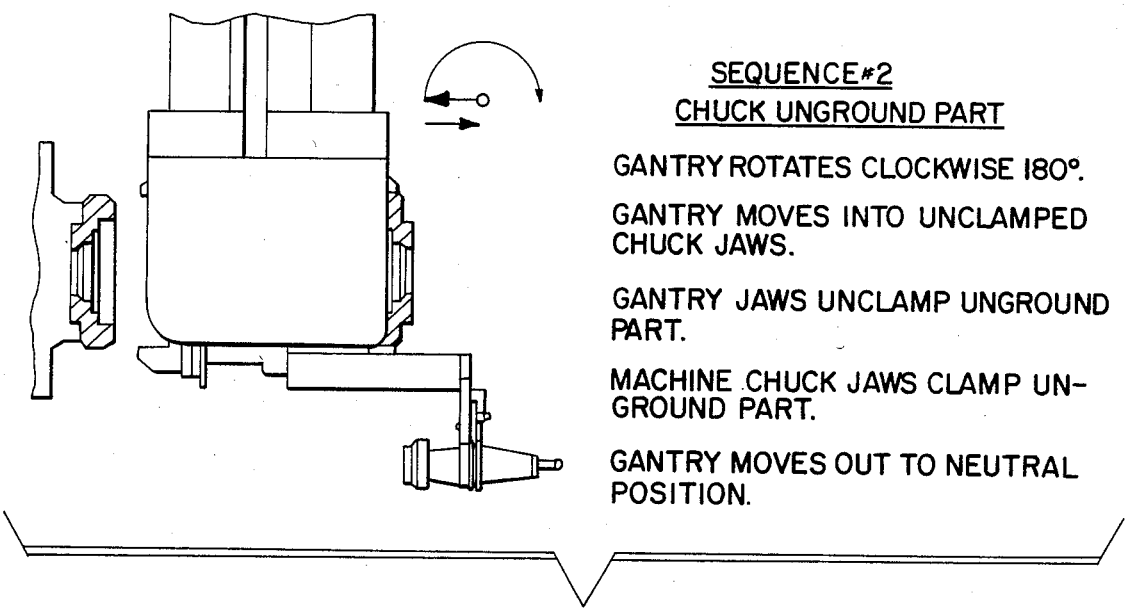

SEQUENCE #2
CHUCK UNGROUND PART

GANTRY ROTATES CLOCKWISE 180°.

GANTRY MOVES INTO UNCLAMPED CHUCK JAWS.

GANTRY JAWS UNCLAMP UNGROUND PART.

MACHINE CHUCK JAWS CLAMP UNGROUND PART.

GANTRY MOVES OUT TO NEUTRAL POSITION.

*Fig. 26b*

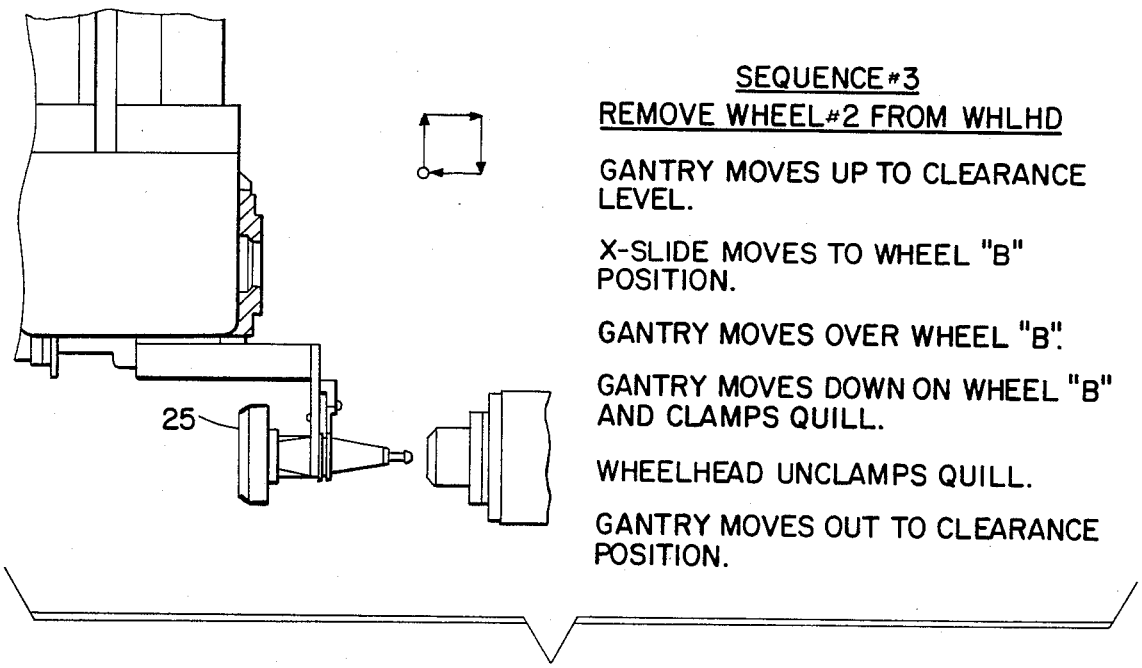

SEQUENCE #3
REMOVE WHEEL #2 FROM WHLHD

GANTRY MOVES UP TO CLEARANCE LEVEL.

X-SLIDE MOVES TO WHEEL "B" POSITION.

GANTRY MOVES OVER WHEEL "B".

GANTRY MOVES DOWN ON WHEEL "B" AND CLAMPS QUILL.

WHEELHEAD UNCLAMPS QUILL.

GANTRY MOVES OUT TO CLEARANCE POSITION.

*Fig. 26c*

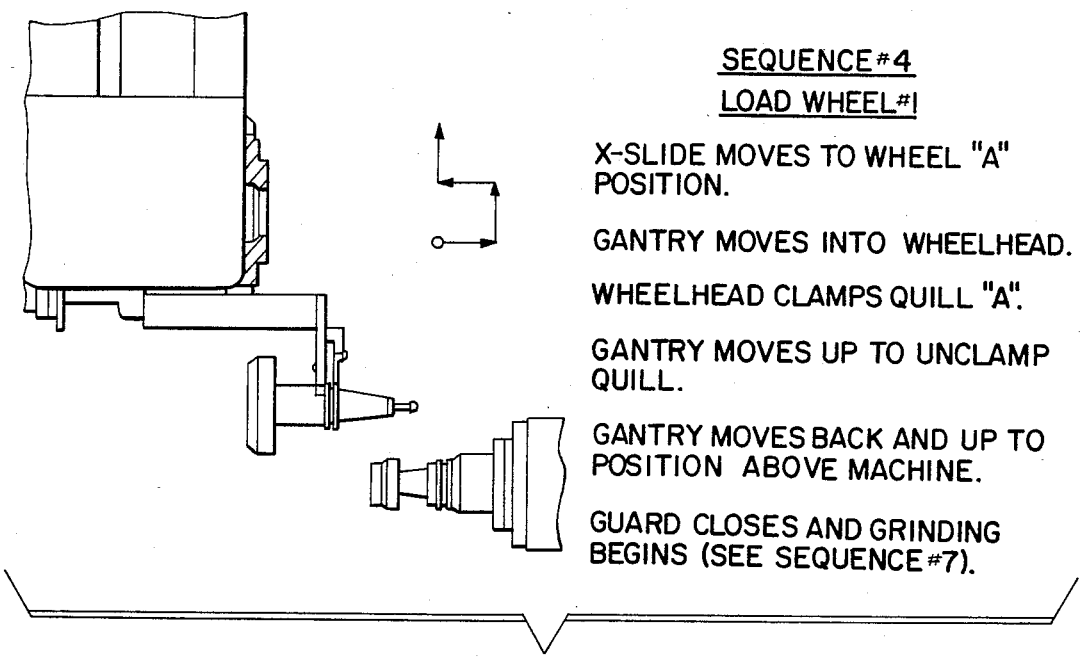

SEQUENCE #4
LOAD WHEEL #1

X-SLIDE MOVES TO WHEEL "A" POSITION.

GANTRY MOVES INTO WHEELHEAD.

WHEELHEAD CLAMPS QUILL "A".

GANTRY MOVES UP TO UNCLAMP QUILL.

GANTRY MOVES BACK AND UP TO POSITION ABOVE MACHINE.

GUARD CLOSES AND GRINDING BEGINS (SEE SEQUENCE #7).

*Fig. 26d*

SEQUENCE #7
I.D. PLUNGE GRIND

FRONT WHEEL "A" GRINDS I.D. PLUNGE OPERATION.

SEQUENCE #8
I.D. VECTOR GRIND

REAR WHEEL GRINDS I.D. VECTOR GRIND OPERATION.

SEQUENCE #9
I.D. FACE RECIP. GRIND

REAR WHEEL GRINDS I.D. FACE RECIP. OPERATION.

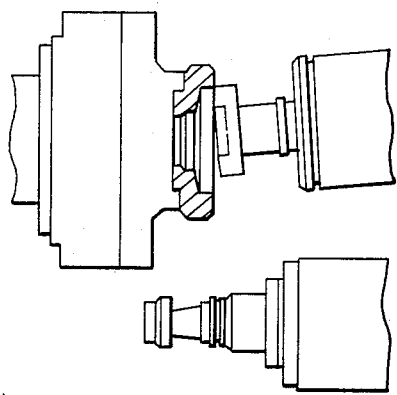

SEQUENCE 10
I.D. RADIUS GENERATION GRIND

REAR WHEEL GRINDS I.D. RADIUS GENERATION OPERATION.

*Fig. 26j*

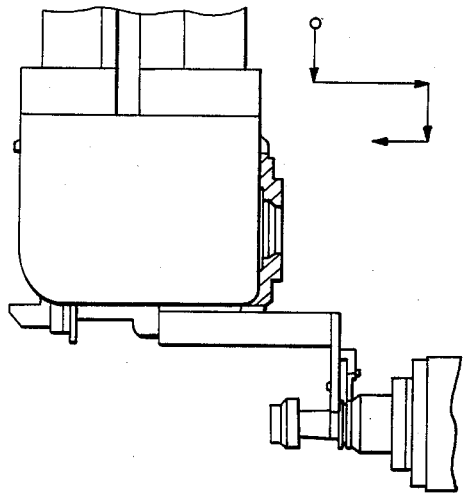

SEQUENCE 11
UNLOAD WHEEL "A"

GUARDS OPEN AND GANTRY MOVES DOWN TO CLEARANCE LEVEL.

GANTRY MOVES OVER WHEEL "A".

GANTRY MOVES DOWN ON WHEEL "A" AND CLAMPS QUILL.

WHEELHEAD RELEASES QUILL.

GANTRY MOVES TO CLEARANCE POSITION.

X-SLIDE MOVES TO WHEEL "B" POSITION

*Fig. 26k*

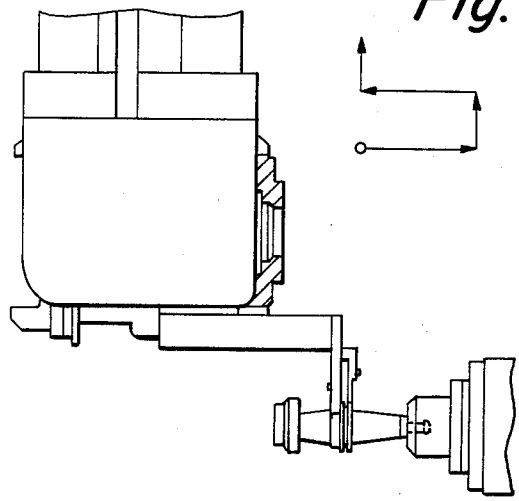

SEQUENCE 12
LOAD WHEEL "B"

GANTRY MOVES INTO WHEELHEAD.

WHEELHEAD CLAMPS WHEEL "B".

GANTRY MOVES UP TO CLEARANCE LEVEL.

GANTRY MOVES BACK AND UP TO NEUTRAL POSITION ABOVE MACHINE.

GUARDS CLOSE.

*Fig. 26l*

SEQUENCE #13
O.D. ANGULAR RECIP. GRIND

FRONT WHEEL "B" GRINDS O.D.
ANGULAR RECIP. OPERATION.

SEQUENCE #14
O.D. DIAMETER PLUNGE GRIND

FRONT WHEEL "B" GRINDS O.D.
DIAMETER PLUNGE OPERATION.

SEQUENCE #15
O.D. DIAMETER RECIP. GRIND

FRONT WHEEL "B" GRINDS O.D.
DIAMETER RECIP. OPERATION

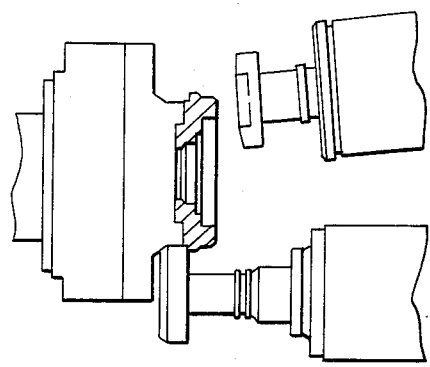

SEQUENCE #16
O.D. REVERSE VECTOR GRIND

FRONT WHEEL "B" GRINDS O.D. REVERSE VECTOR GRIND OPERATION.

X-SLIDE AND TABLE MOVE TO LOAD POSITION.

CYCLE IS COMPLETE.
START AGAIN AT SEQUENCE #1.

*Fig.26p*

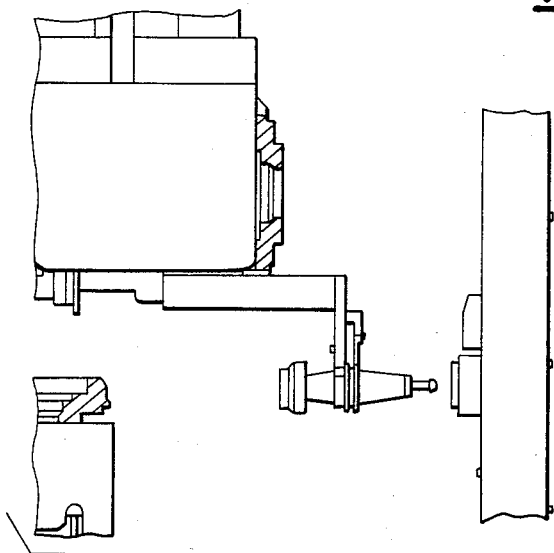

WORN WHEEL CHANGE

GANTRY MOVES TO EMPTY TOOL-HOLDER HEIGHT.

TOOLHOLDER TABLE INDEXES TO CORRECT POSITION.

GANTRY MOVES INTO HOLDER.

HOLDER CLAMPS QUILL.

GANTRY MOVES UP OFF OF QUILL

GANTRY MOVES BACK TO CLEARANCE POS.

*Fig.27a*

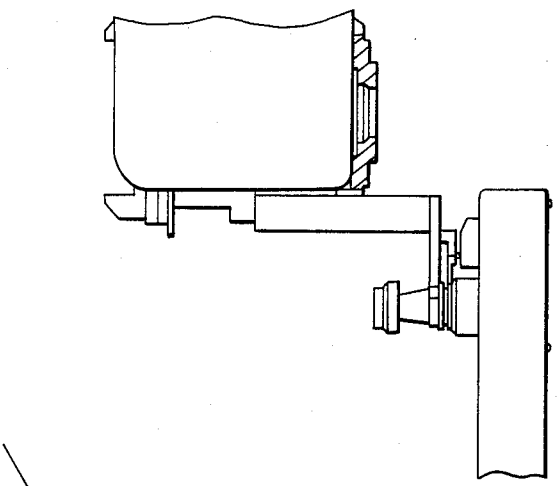

GANTRY MOVES TO CLEARANCE POSITION ABOVE AVAILABLE TOOL.

GANTRY MOVES OVER QUILL.

GANTRY MOVES DOWN ONTO QUILL.

GANTRY PULLS QUILL OUT OF HOLDER. (SPRING RETAINED)

GANTRY MOVES BACK TO CLEARANCE POSITION.

GANTRY MOVES UP AND OVER TO A NEUTRAL POSITION ABOVE GUARDS.

*Fig.27b*

GRINDING MACHINE WITH APPARATUS FOR CHANGING GRINDING WHEEL TOOLS AND WORKPIECES

BACKGROUND OF THE INVENTION

The invention relates generally to the grinding machine arts, which employ gantry type loading mechanisms for substituting rough and finished workpieces with the machine holding chuck. Gantry type loaders are very old in the grinding machine industry, and have been used to substitute both flange type and shaft type workpieces in the auto industry for example, where the workpieces are picked off of a moving conveyor passing alongside the grinding machine. In such assemblies, the workpiece is moved from the conveyor line; taken to the grinding machine; and inserted into the grinding zone. After grinding, the workpieces are removed from the grinding zone and lifted from the machine environment to be returned to the work conveyors.

Prior art systems combining grinding machines with gantry type loaders generally utilize a single wheel assembly for performing a "dedicated" production grinding operation on the workpiece.

In modern day flexible machining systems (FMS) the attempt is made to machine workpieces on untended work machining centers during extended shifts, and even during around-the-clock operation.

The present invention is directed at a versatile grinding machine, configured generally as an internal grinding machine might be configured, wherein a workhead assembly supports and drives a workpiece of revolution, while a grinding wheel tool is carried on X and Z slides, i.e. movable radially and axially of the workpiece respectively. In the instant invention, a wheelhead is configured to releaseably support a variety of grinding wheel tools having complementary tool shanks, and the various grinding wheel tools are automatically removed from the grinding wheel spindle and are exchanged with a grinding wheel tool storage matrix located at a point remote from the work grinding zone. Additionally, the workpieces are automatically removed from the work holding spindle and are exchanged with a palletized work conveyor system likewise located at a point remote from the grinding zone. The interchange of workpieces and grinding wheel tools is carried out by means of a special gantry device.

It is therefore an object of the present invention to provide for a grinding machine having a grinding wheel tool changing device in combination with a workpiece changer.

SUMMARY OF THE INVENTION

The invention is shown embodied in a grinding machine having a workhead spindle for supporting and driving a workpiece and having a grinding wheelhead with a grinding wheel spindle for rotating and supporting a grinding wheel tool. The grinding wheel tool is releaseably carried in the wheelhead, and an improved workpiece changer is employed, having a base frame straddling the machine work zone and a remotely-located tool storage matrix and work storage matrix. A carriage is movable on the frame between the tool storage matrix and the grinding wheelhead, and between the work support spindle and the work storage matrix. Chucking means is located on carriage for releaseably supporting a plurality of grinding wheel tools and a plurality of workpieces.

BRIEF DESCRIPTION OF THE DRAWINGS

FIG. 25 is a section through a typical part illustrating various grind operations.

FIGS. 27a and 27b illustrate the interaction of the tool changer with the tool storage matrix for substituting a worn wheel with a new wheel of the same profile.

DESCRIPTION OF THE PREFERRED EMBODIMENT

Grinding Machine Structure

Figure 1:
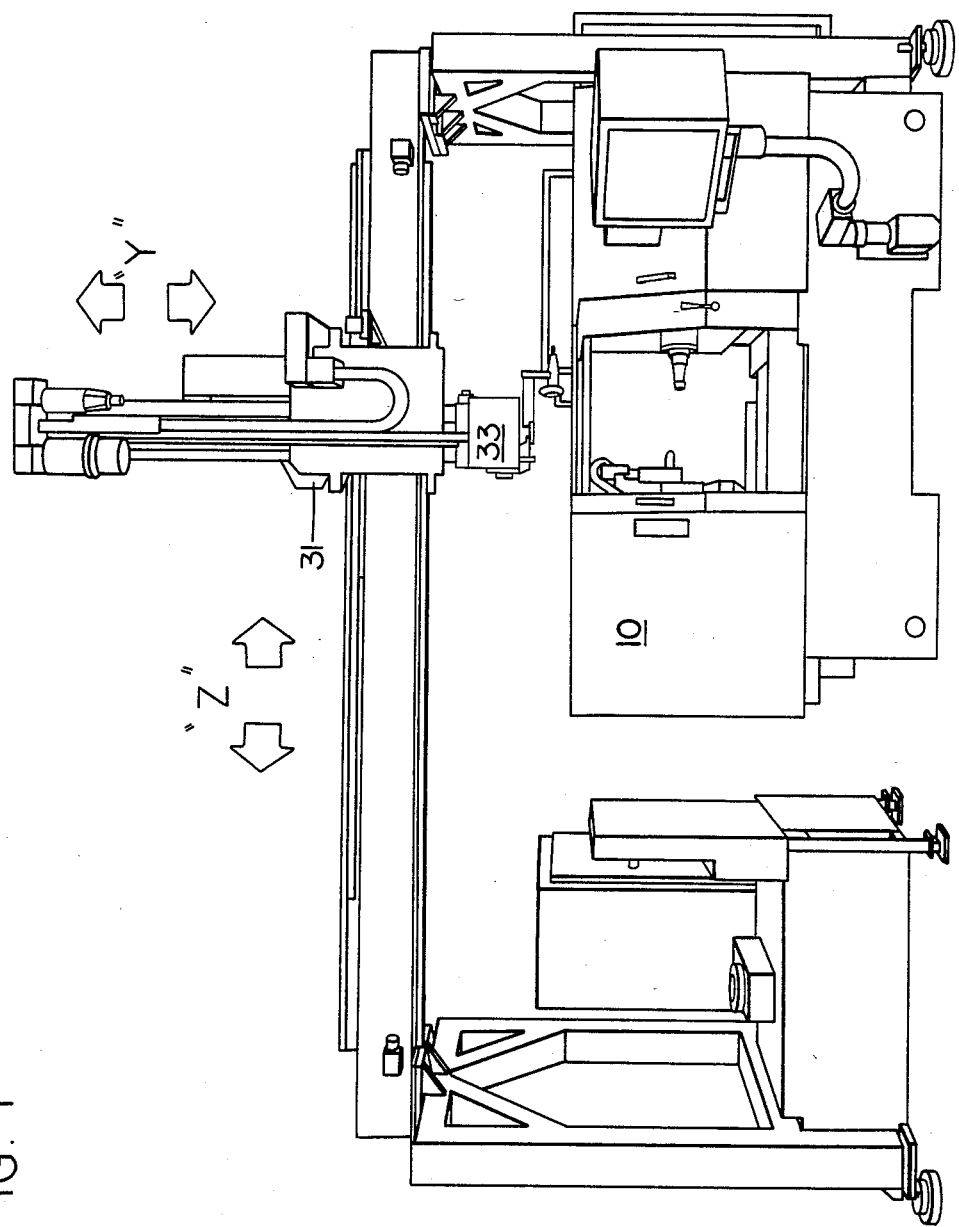
FIG. 1 is a front elevational view of a grinding machine system employing a combination work changer and tool changer.
Figure 2:
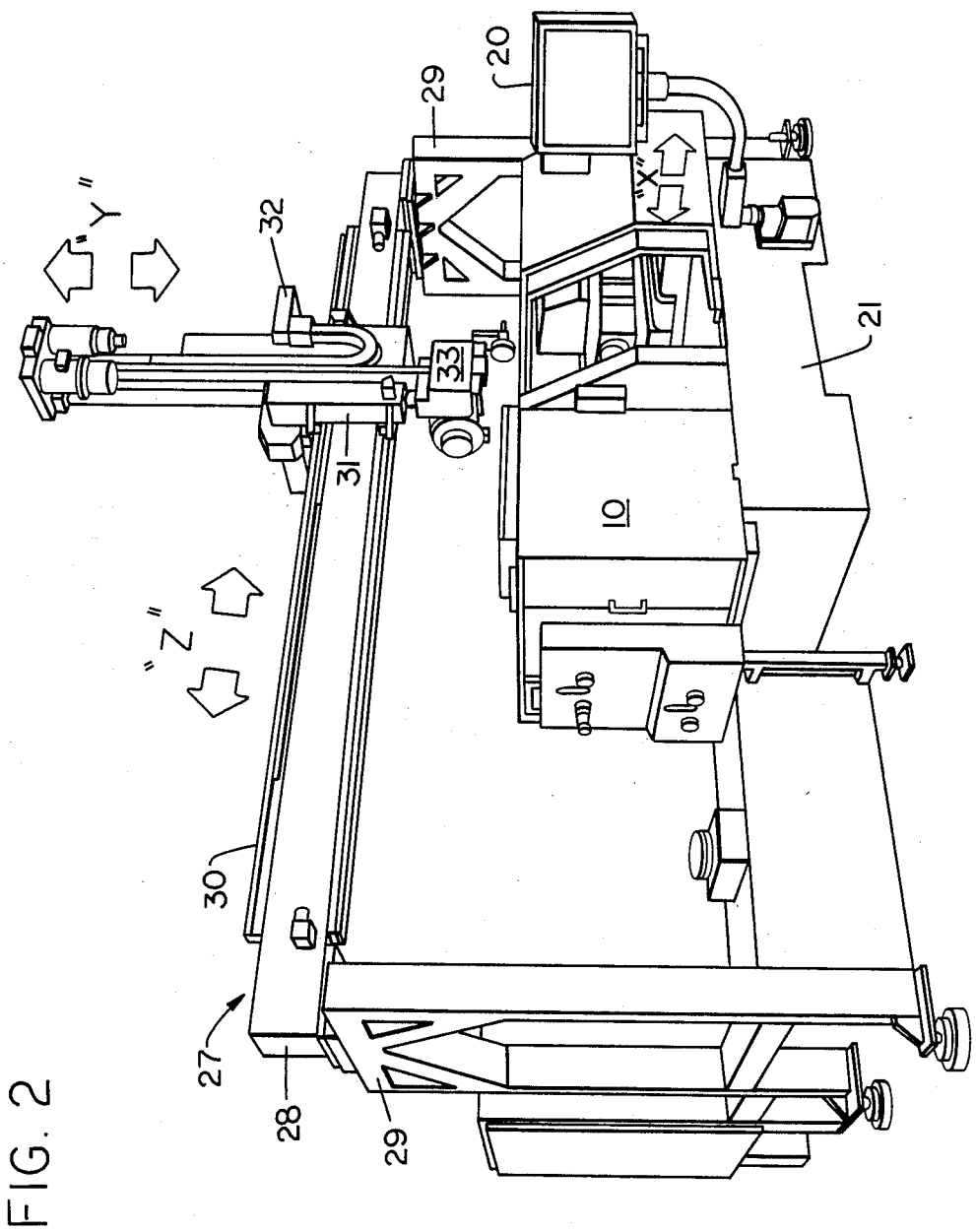
FIG. 2 is a perspective view of the grinding system depicted in FIG. 1.

Referring to FIGS. 1-5 of the drawings, there is shown a grinding machine 10 having a workhead 11 for supporting and rotating a workpiece 12 during a grinding operation, and a wheelhead 13 is provided which is mounted to a cross slide 14 and table 15. The table 15 serves to provide movement in an axial direction with respect to the workpiece 12, i.e. the Z direction of movement. The table 15 is powered by a screw 16 and motor 17 and the cross slide 14 is movable on the table 15 in a direction radial to the workpiece, (into the plane of the paper in FIG. 1) i.e. the X direction. The cross slide 14 is powered by a motor 18 and screw 19 combination so that the wheelhead 13 will move linearly on the table 15. The motor movements for the X and Z directions are controlled by the machine controller 20 which is carried on the machine base 21. Referring to FIG. 2 in combination with FIG. 1, the cross slide 14 supports a second grinding wheelhead 22 mounted behind the front wheelhead 13. Both wheelheads 13,22 move in unison. The second grinding wheelhead 22 utilizes a fixed grinding wheel tool 23 while the front wheelhead 13 is adapted to accept a variety of grinding wheel tools 24,25 which may be automatically interchanged with the wheel spindle 26.

Loading Mechanism

A gantry type loader 27 is employed in conjunction with the grinding machine 10, and is basically one of a variety of commercial type gantry loaders such as might be purchaed from MMD Co. in Germany, wherein an overhead gantry rail 28 is mounted parallel to the Z axis of table movement, and the gantry rail 28 is supported by fabricated end support structures 29. The gantry rail 28 has guide rails 30 which support a carriage 31 which is propelled by a motor drive 32 on the guide rails 30 along the direction of Z movement. The carriage 31 supports a slidable loading head 33 which may be movable in a vertical direction relative to the carriage 31, i.e. the Y direction of movement. The loading head 33 supports a pair of gripper chucks 34 which are oppositely disposed about a horizontal pivot point 35 on the loading head 33, and the gripper chucks 34 may be rotated end-for-end through 180 degrees of movement so that a finished workpiece 12 may be removed from the workhead spindle 11a and a rough piece 12 inserted in the spindle 11a. The gantry loader 27 described to this point is commercially available, but a pair of special mechanical tool grippers 36 are attached to the loading head 33 and the grippers 36 serve to remove a first grinding wheel tool 24 from the front grinding wheel spindle 26 and insert a substitute grinding wheel tool 25 into the wheel spindle 26. The tool grippers 36 are arranged on the loading head 33 so that only the Z and Y movements of the loader 27 are utilized for tool changing, while the X movement of the cross slide 14 is used to present the wheelhead spindle 26 alternately to the tool grippers 36.

Figure 3:
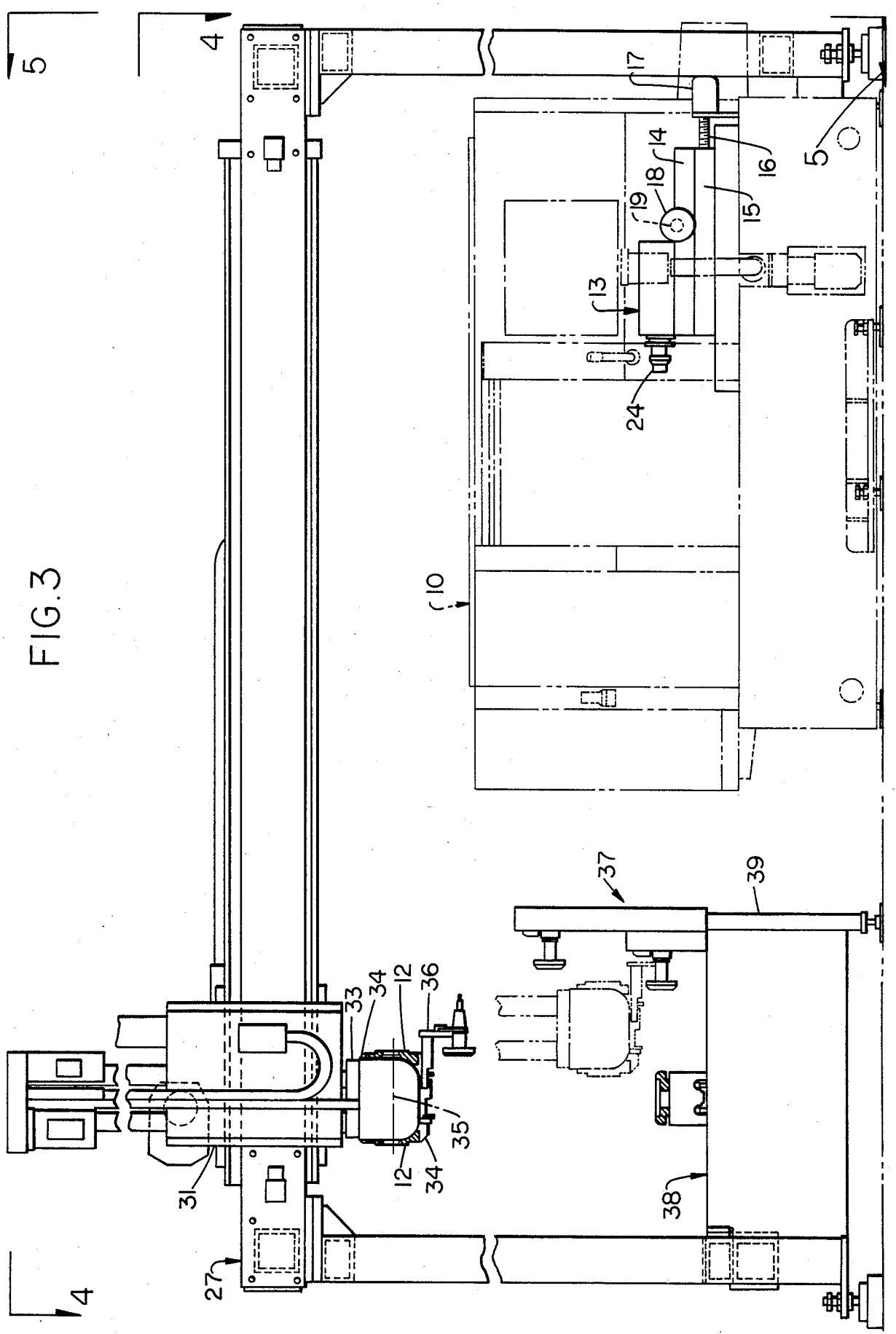
FIG. 3 is a front elevational view of the gantry system of FIG. 2.

FIG. 3 illustrates the range of movement of the loading head 33 on the gantry loader 27 with respect to the grinding machine 10. The tool grippers 36 are shown in solid above a tool storage matrix 37 which is remotely located with respect to the grinding machine 10, and the phantom position of the loading head 33 illustrates the range of Y movement of the grinding wheel tools 24,25 with respect to the tool storage matrix 37. The workpiece storage matrix 38, or work staging area, is shown mounted to the same base 39 as the tool storage matrix 37.

Figure 4:
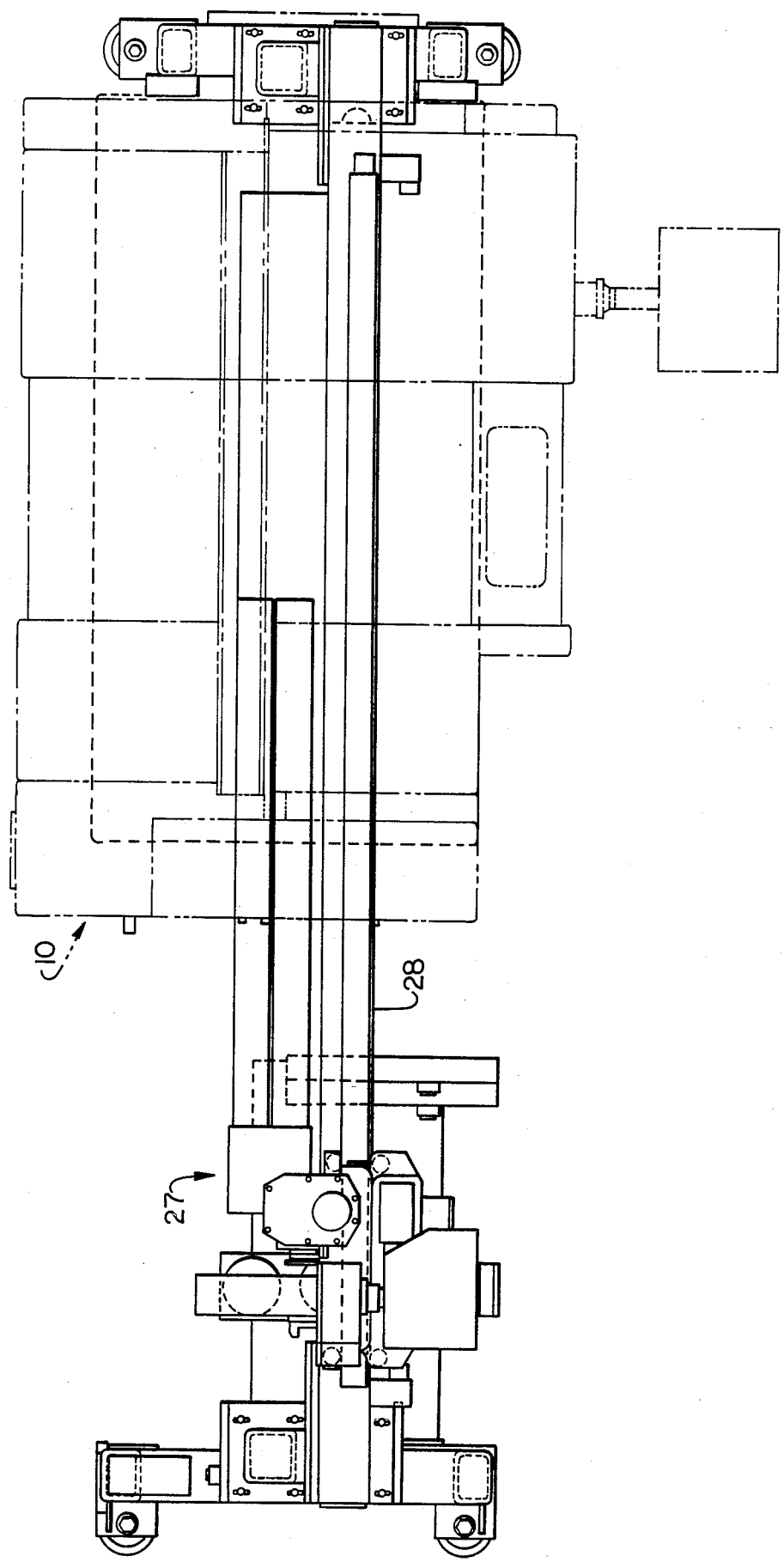
FIG. 4 is a plan view of the gantry system of FIG. 3 taken in the direction of arrow 4 of FIG. 3.

FIG. 4 illustrates the plan view of the gantry loader 27 and gantry rail 28 with respect to the grinding machine 10.

Figure 5:
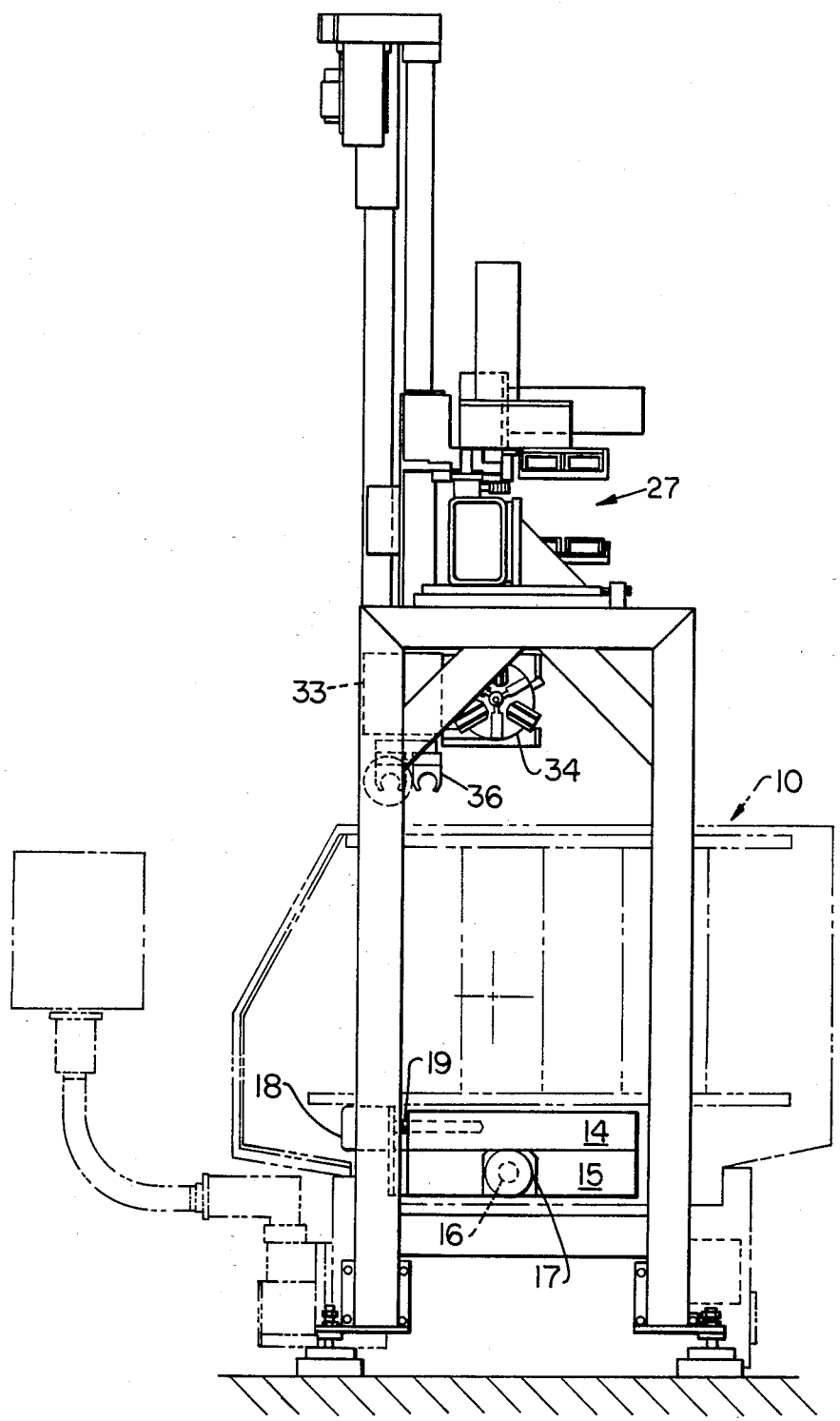
FIG. 5 is a side elevational view taken in the direction of arrow 5 of FIG. 3.

FIG. 5 is an end view depicting the gantry loader 27 illustrating the loading head 33 with the work gripper chucks 34 and the tool grippers 36 in position.

Figure 6:
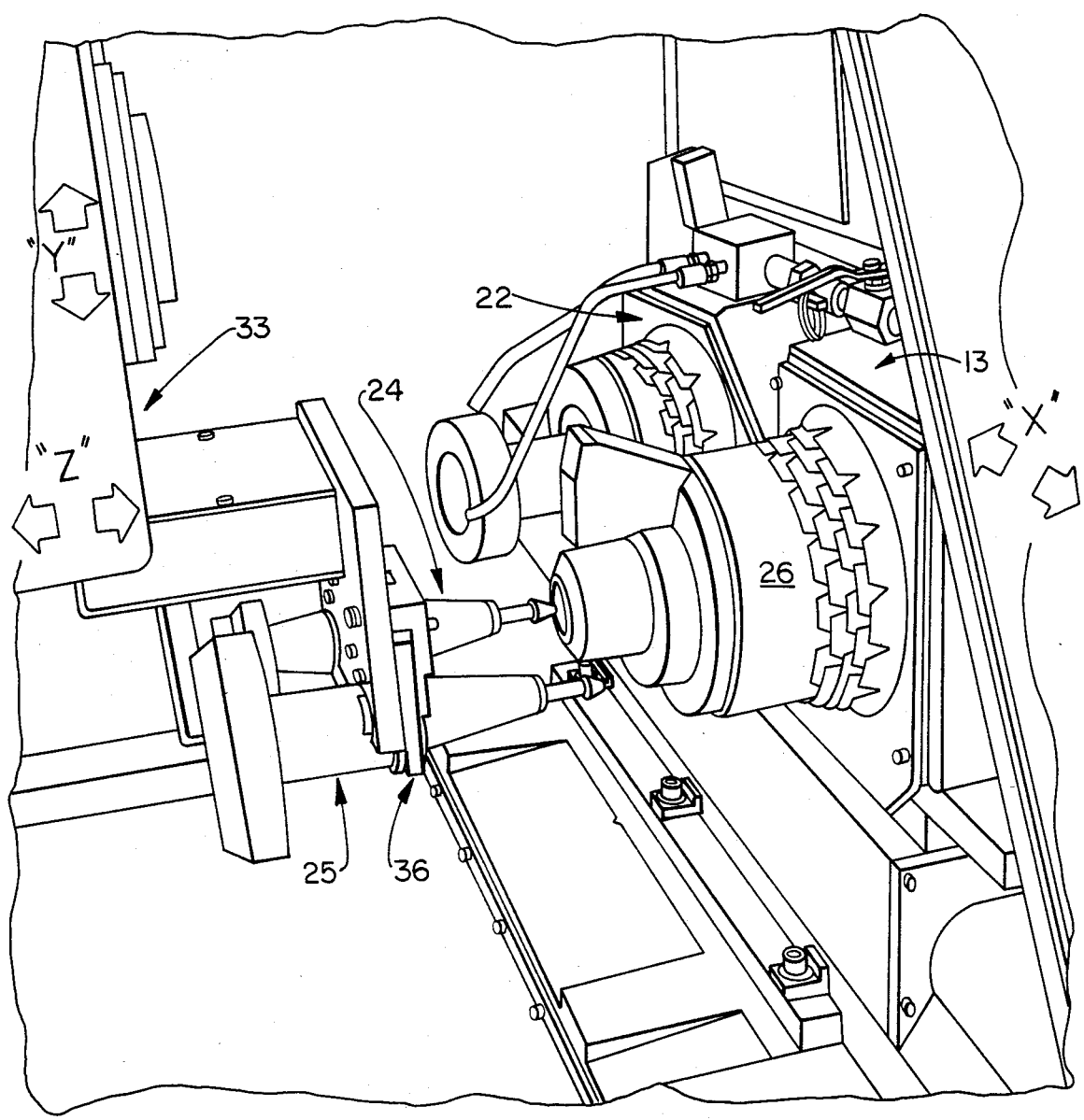
FIG. 6 is a front perspective view of the wheelhead of FIG. 1.

The perspective view of FIG. 6 illustrates a close-up view of the two wheelheads 13,22 which are mounted to the cross slide 14 of the machine 10, and the two exemplary grinding wheel tools 24,25 are shown being carried by the tool grippers 36 which are affixed to the loading head 33. The rearmost tool 24 is shown in line with the grinding wheel spindle 26.

Figure 7:
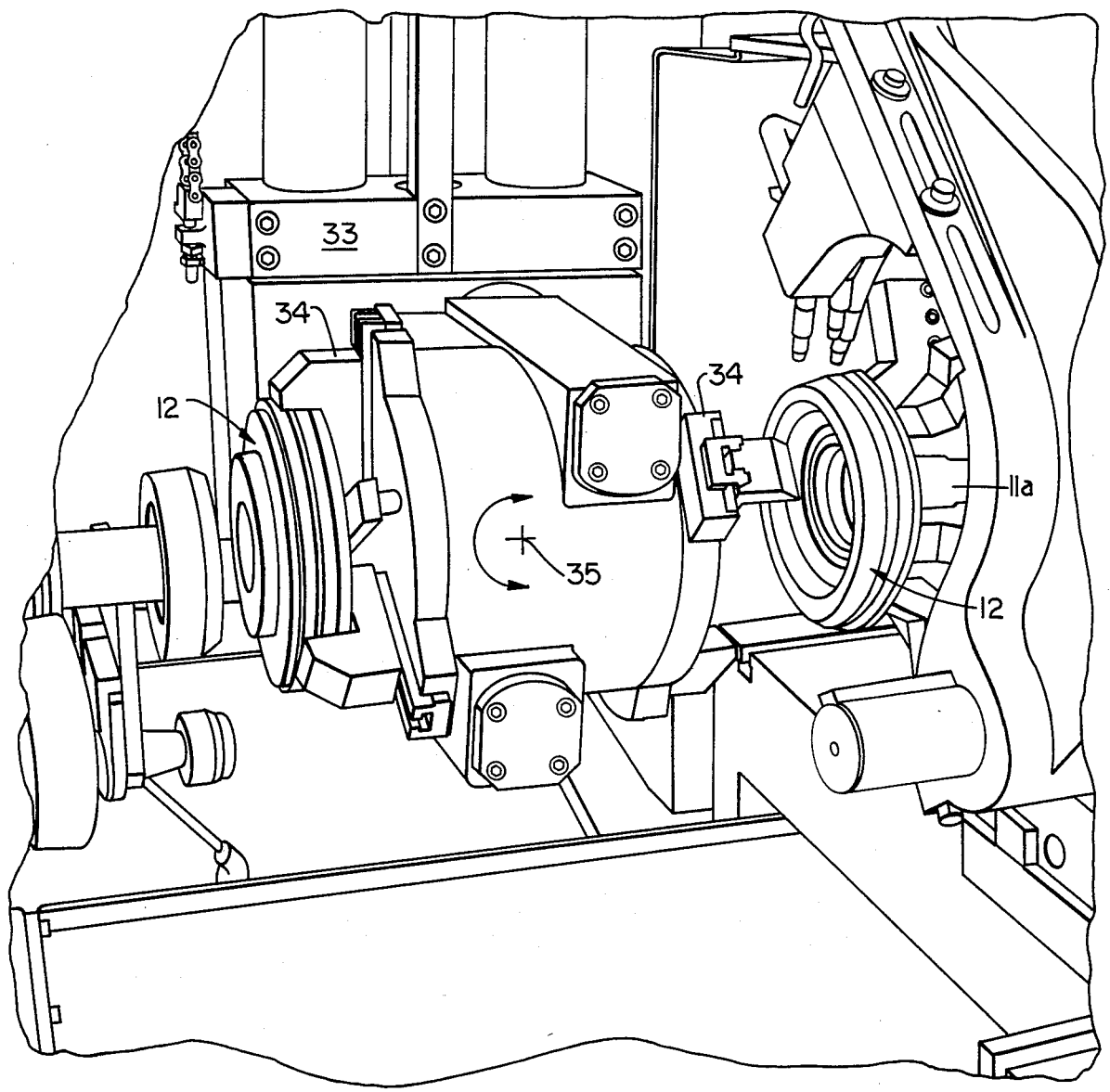
FIG. 7 is a rear perspective view of the work holding spindle of FIG. 1.

The perspective view of FIG. 7 is a rear view illustrating the dual workpiece gripper chucks 34 showing a finished workpiece 12 still mounted in the workhead spindle 11a, while a rough workpiece 12 is carried by the workpiece gripper chuck 34. The gripper chucks 34 may be rotated end-for-end to reverse the positions of the workpieces 12 after the finished workpiece is extracted from the workhead spindle 11a.

Front Wheelhead

Figure 8:
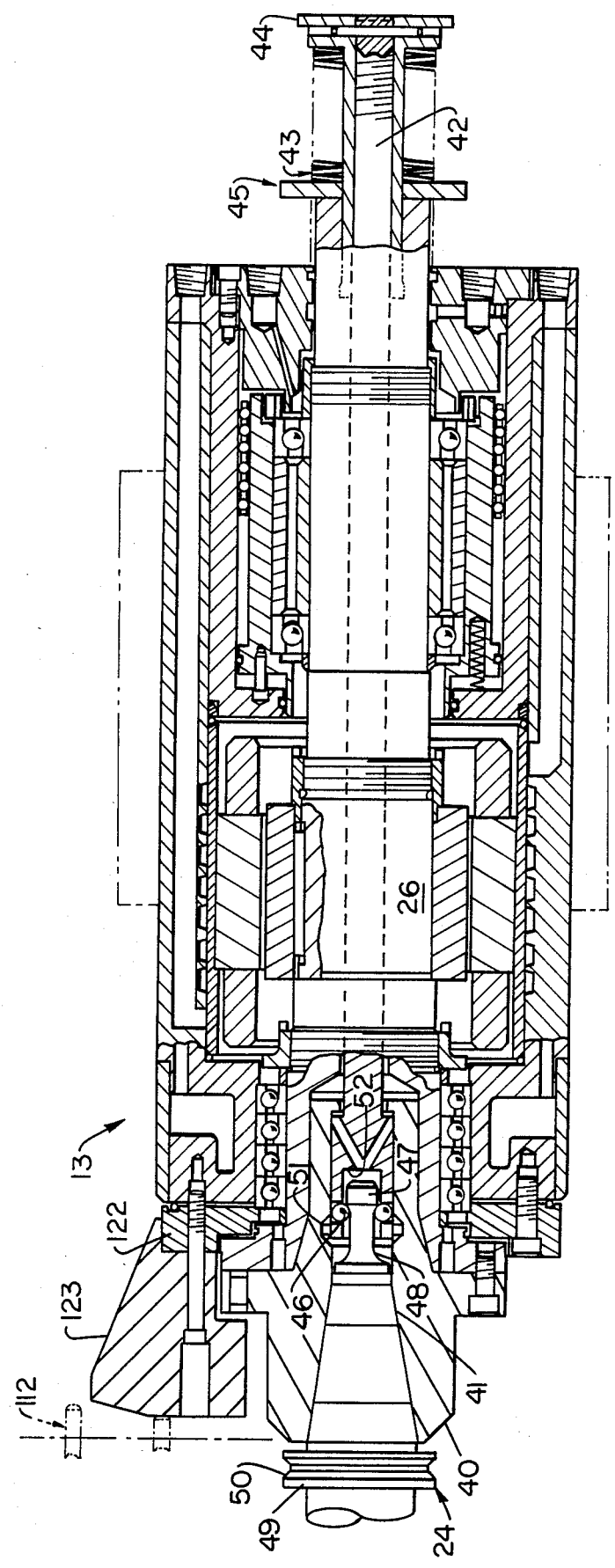
FIG. 8 is an elevational section through the grinding wheel spindle of the wheelhead of FIG. 1.

The sectional view in FIG. 8 illustrates the grinding wheel spindle 26 of the front wheelhead 13, showing that the spindle nose 40 is adapted to receive the tapered shank 41 of a typical grinding wheel tool 24. The tool 24 is retained by a drawbar 42 which is biased in a rearward direction by a stack of belleville springs 43 bearing against a drawbar flange 44 and a spindle flange 45. The rearward biasing of the drawbar 42 serves to drive a plurality of balls 46 radially inward and axially against the head 47 of a tool retention stud 48 which is part of the tool shank 41. The tool shank 41 has an outer flange 49 having a V-shaped groove 50 around its periphery so that the tool grippers 36 may engage the tool 24. When it is desired to release the tool 24 for a tool change, the drawbar 42 is pushed forward by a drawbar actuating mechanism (not shown) bearing against the drawbar flange 44, which forces the drawbar 42 in a forward direction where the balls 46 are released into a recess groove 51 around the drawbar, and the end of the stud-receiving counterbore 52 strikes the head 47 of the retention stud 48 to bump the tool 24 from the spindle nose 40.

Work Staging Area and Tool Storage Matrix

Figure 9:
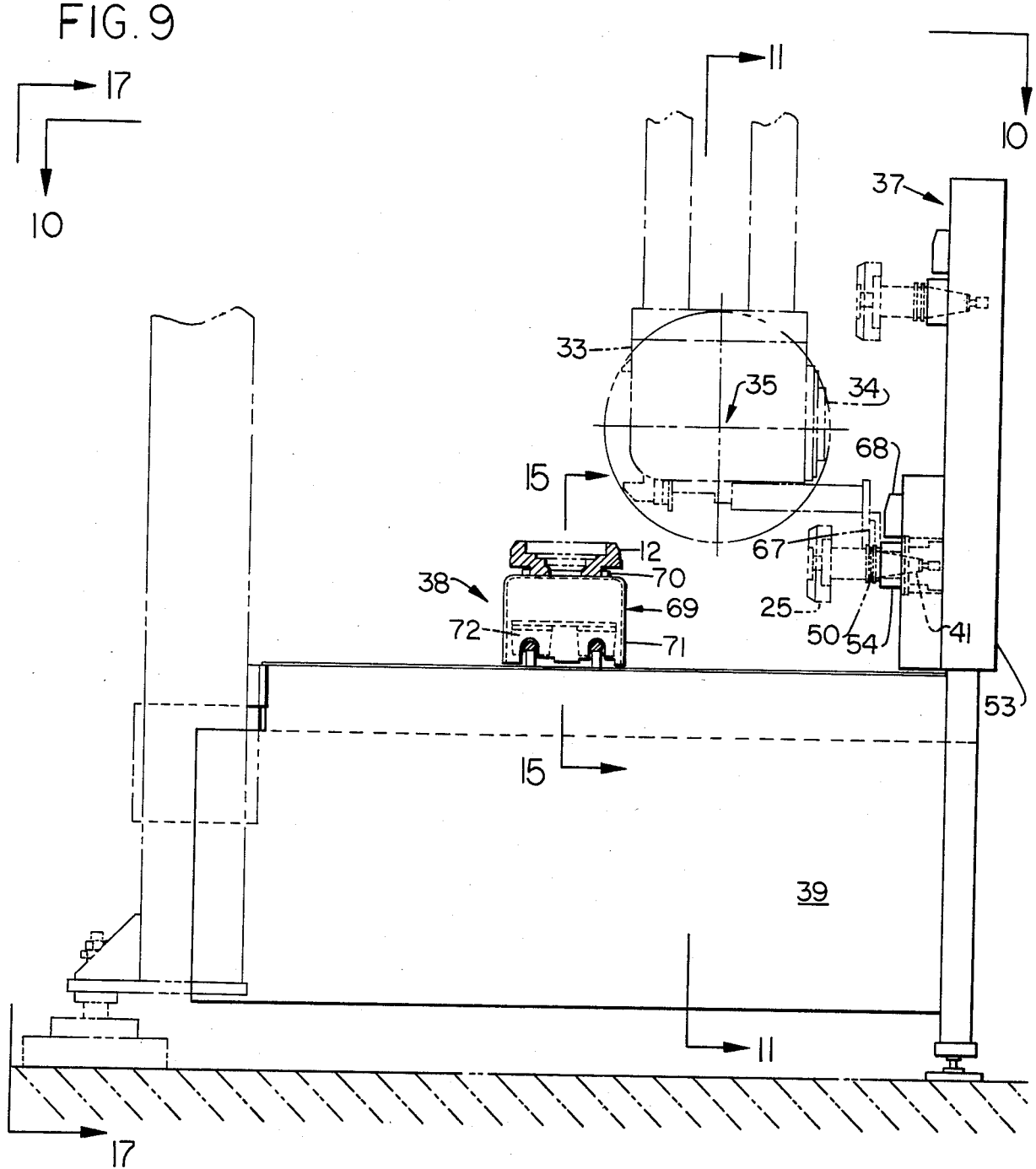
FIG. 9 is an enlarged front elevational view of the work storage matrix and tool storage matrix of FIG. 1.
Figure 18:
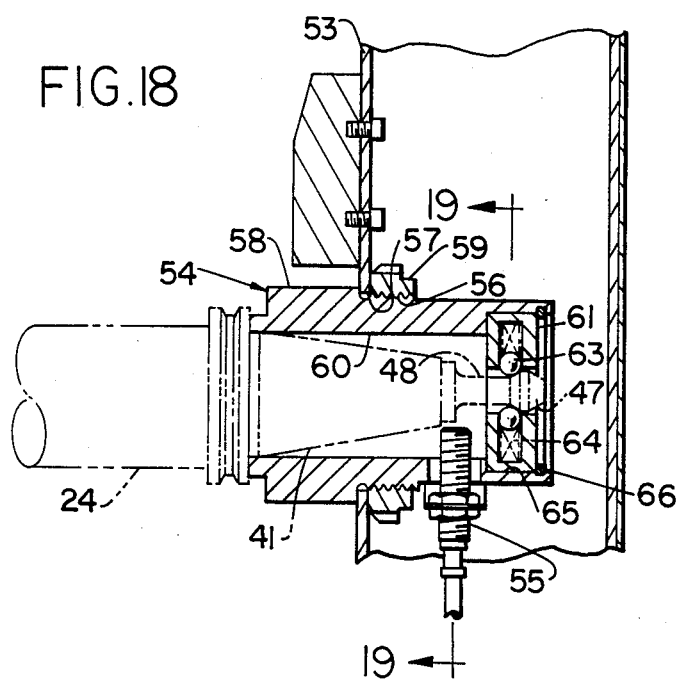
FIG. 18 is an elevational section taken through the tool storage matrix tool support pocket taken along the line 18—18 of FIG. 17.
Figure 19:
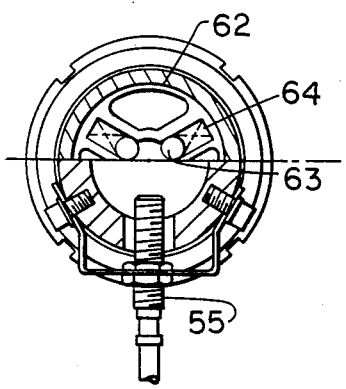
FIG. 19 is a section through the tool retention device of the tool storage pocket taken along the line 19—19 of FIG. 18.

FIG. 9 is an enlarged view of the work staging area 38 and tool storage matrix 37 of FIGS. 1 and 2, illustrating that the fabricated base 39 is common to both assemblies. The right hand end of the base 39 supports a vertical table 53 which is movable in the Z direction and the table 53 has a plurality of tool storage pockets 54 which may receive the shanks 41 of respective grinding wheel tools 24,25. The loading head 33 which is movable in Z and Y directions, carries the grippers 36 necessary for transporting the grinding wheel tools 24,25. All gripping of the tools 24,25 is mechanically accomplished, without the need for a power interface. Referring for the moment to FIG. 18 and 19, the tool storage pocket 54 is shown with a proximity switch 55 secured therein to sense the presence or absence of a tool shank 41. The tool pocket 54 is a cylindrical member having a threaded portion 56 which is received through an opening 57 in the sheet metal table 53, and the flange diameter 58 of the tool pocket 54 is drawn up to the sheet metal table 53 by a lock nut 59. The tool pocket 54 has a central bore 60 therethrough, and a retention assembly 61 is located at the rear of the pocket 54. The retention assembly 61 is a disc-shaped member 62 having a plurality of radially movable balls 63 which are biased by springs 64 to a central axis, and the retention assembly 61 is held in a bore 65 in the tool pocket 54 by a snap ring 66. The balls 63 serve to entrap the head 47 of the tool retention stud 48. The tool 24 may be withdrawn in an axial direction by a gripper 36 which will overcome the ball holding force.

Figure 24:
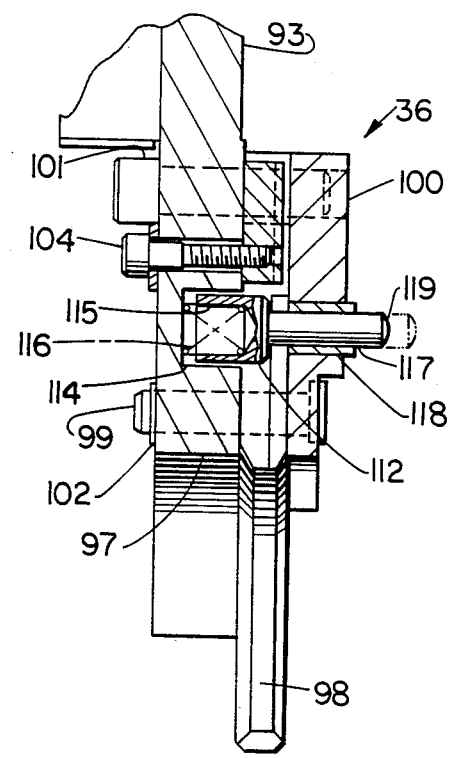
FIG. 24 is a partial front elevational section through the gripper fingers taken along the line 24—24 of FIG. 23.

Referring back to FIG. 9, the grippers 36 may be advanced onto the tool shank by movement of the loading head 33 in the Y direction, wherein the spring-biased jaws 67 of the grippers 36 will spread and clamp onto the V groove 50 of the tool 25. Thereafter, to withdraw the tool 25 the loading head 33 is moved in the Z direction, to withdraw the tool shank 41 from the tool support pocket 54. Similarly, when placing a tool 25 in the pocket 54 movement of the loading head 33 is in the Z direction to insert the tool shank 41 into the tool support pocket 54, while thereafter the tool grippers 36 are withdrawn in a radial direction off the tool shank 41 by Y movement of the loading head 33. An unlocking cam 68 is located at each tool pocket 54, and will be discussed further in conjunction with FIGS. 22-24.

Figure 10:
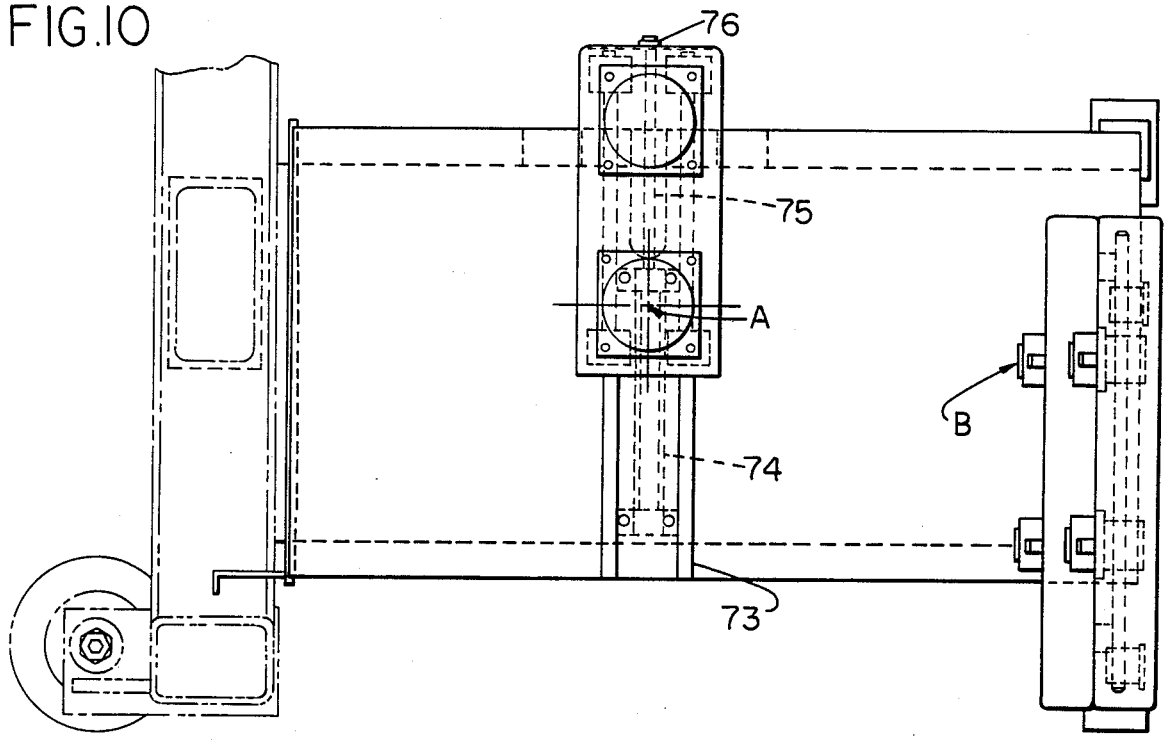
FIG. 10 is a plan view taken in the direction of arrow 10 of FIG. 9.
Figure 16:
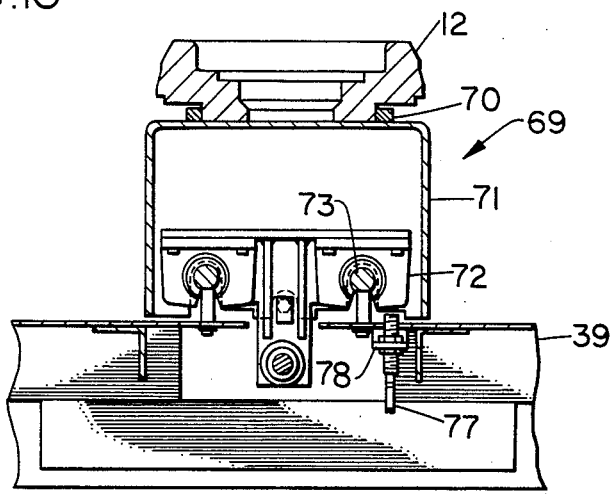
FIG. 16 is a front elevational section through the work support matrix taken along the line 16—16 of FIG. 15.

The workpieces 12 are supported on a work pallet 69 which may be shuttled in the X direction as is depicted in FIG. 10 to present alternate work supports 70 to a common pick up point "A". Additionally, as shown in FIG. 10, the tool support pockets 54 may likewise be shuttled alternately to a common pickup point "B". As stated previously, there is no X movement in the gantry loader 27. The work support pallet 69 is a fabricated housing 71 attached to a plurality of ball bushing assemblies 72 which are slidable on ball support bars 73 affixed to the base 39. A fluid cylinder 74 is attached to the base 39 and the piston rod 75 of the cylinder 74 is attached to an end bracket 76 of the pallet 69 to propel the assembly in the X direction. The top of the fabricated pallet 69 carries the part-specific work supports to accept the workpieces 12. FIG. 16 shows a proxmity switch 77 located on a bracket 78 on the base 39 to indicate the position of the pallet 69 by sensing movement of the ball bushing assemblies 72.

Figure 11:
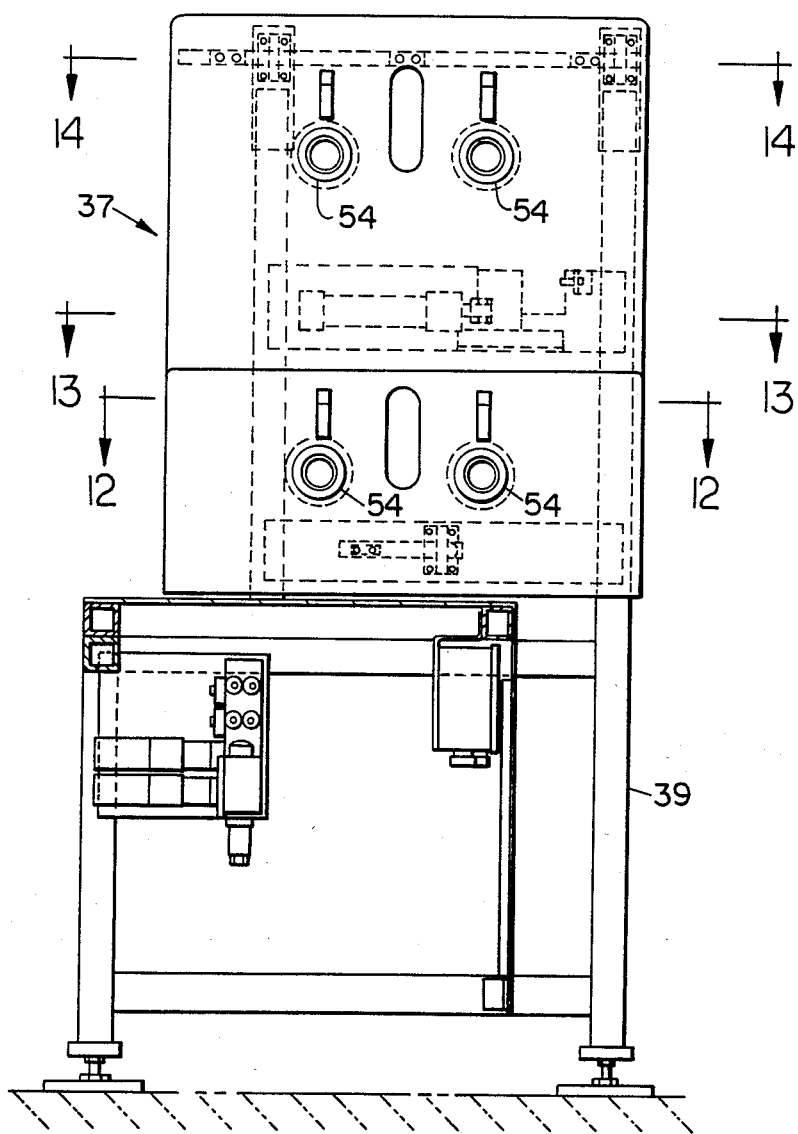
FIG. 11 is an elevational section through the gantry device taken along the line 11—11 of FIG. 9.

The elevational view of FIG. 11 illustrates the vertical table 53 of the tool storage matrix 37. The table 53 is a fabricated sheet metal assembly having an upper pair of side-by-side tool pockets 54 for supporting two different grinding wheel tools 24,25 which may be interchanged with one another. The lower pair of tool support pockets 54 serve to hold sharpened substitute tools which may be brought into service when the upper tools become worn (see FIGS. 27a,b).

Figure 13:
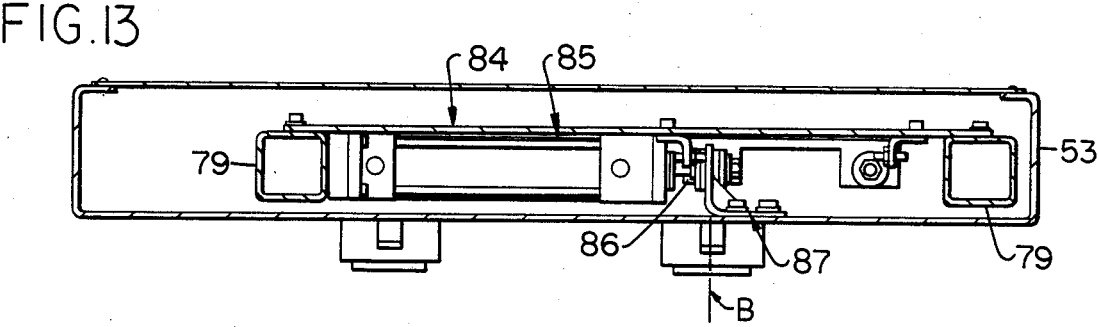
FIG. 13 is a plan section taken through the tool storage matrix cross slide cylinder taken along the line 13—13 of FIG. 11.
Figure 14:
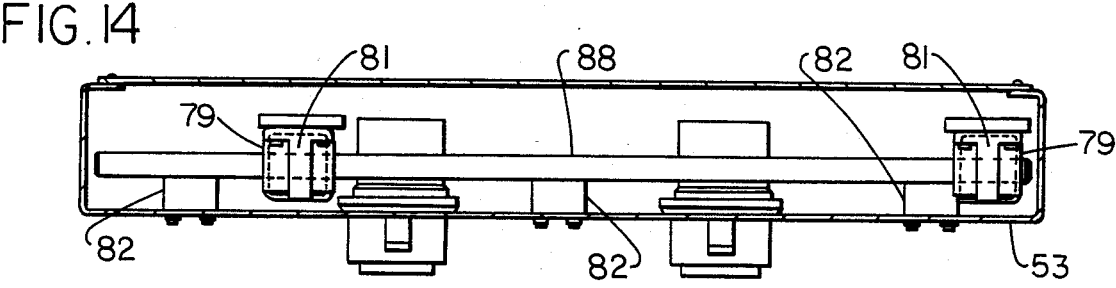
FIG. 14 is a plan section taken through the tool storage matrix slide bar taken the line 14—14 of FIG. 11.
Figure 12:
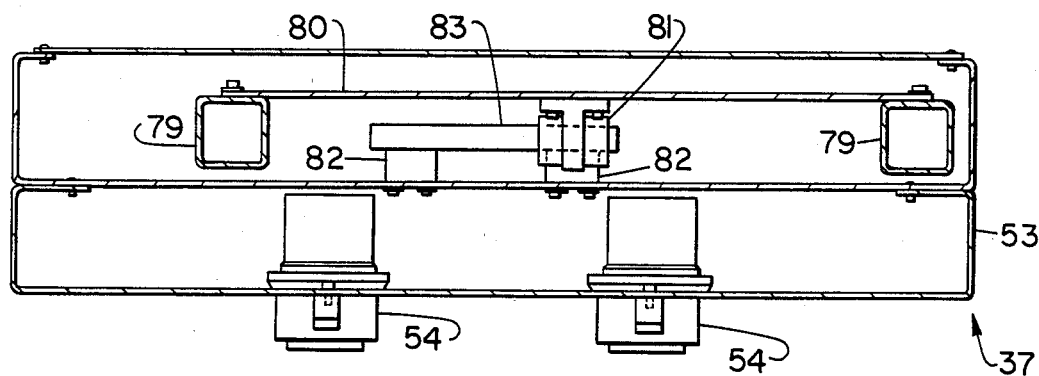
FIG. 12 is a plan section of the tool storage matrix slide bar taken along the line 12—12 of FIG. 11.
Figure 15:
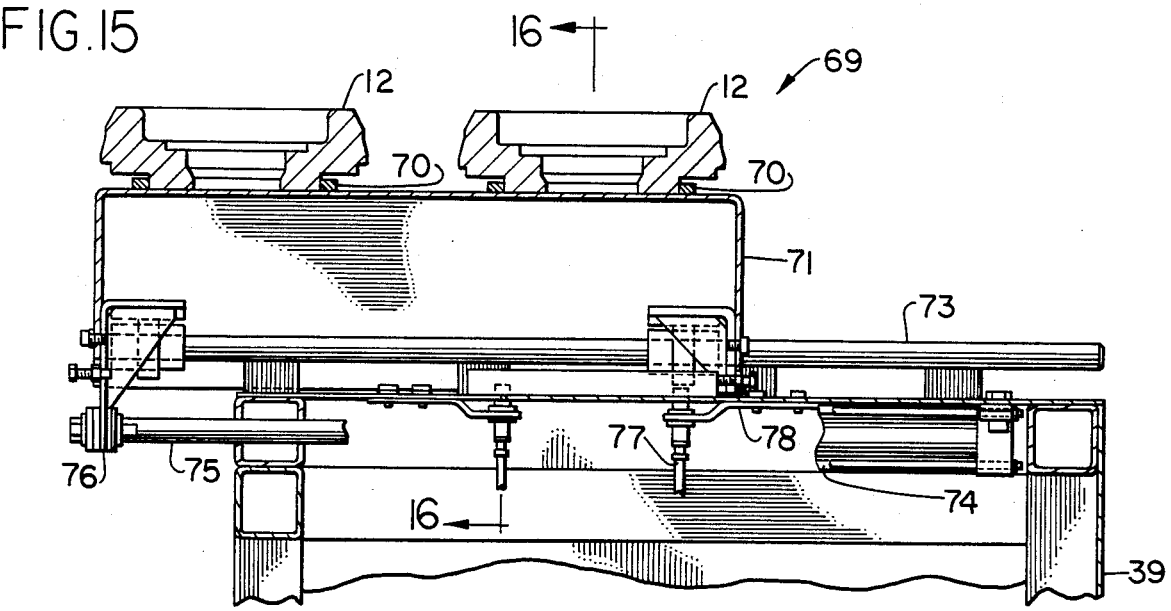
FIG. 15 is a side elevational section taken through the work support matrix taken along the line 15—15 of FIG. 9.

FIG. 12 illustrates that the vertical square tubing 79 is part of the base 39, and the tubing 79 has a cross member 80 bolted thereto. The cross member 80 carries a ball bushing assembly 81 which is stationary, and the sheet metal table 53 is affixed to a pair of blocks 82 and ball support bar 83. The bar 83 serves to act as a guide during Z movement of the vertical table 53. FIG. 13 illustrates that the vertical support tubing 79 also carries a cross member 84 which supports a fluid cylinder 85 whose piston rod 86 is tied to a bracket 87 which in turn is fixed to the sheet metal table 53 in order to propel the table 53 in the Z direction to shuttle the pockets 54 to a common tool pickup point "B". The section shown in FIG. 14 further illustrates that the vertical support tubing 79 carries an additional pair of ball bushing assemblies 81 at the topmost end, and a ball bar 88 is guided through the ball bushing assemblies 81 and is affixed through blocks 82 to the sheet metal table 53 to provide guidance for the table 53 during X movement.

Figure 17:
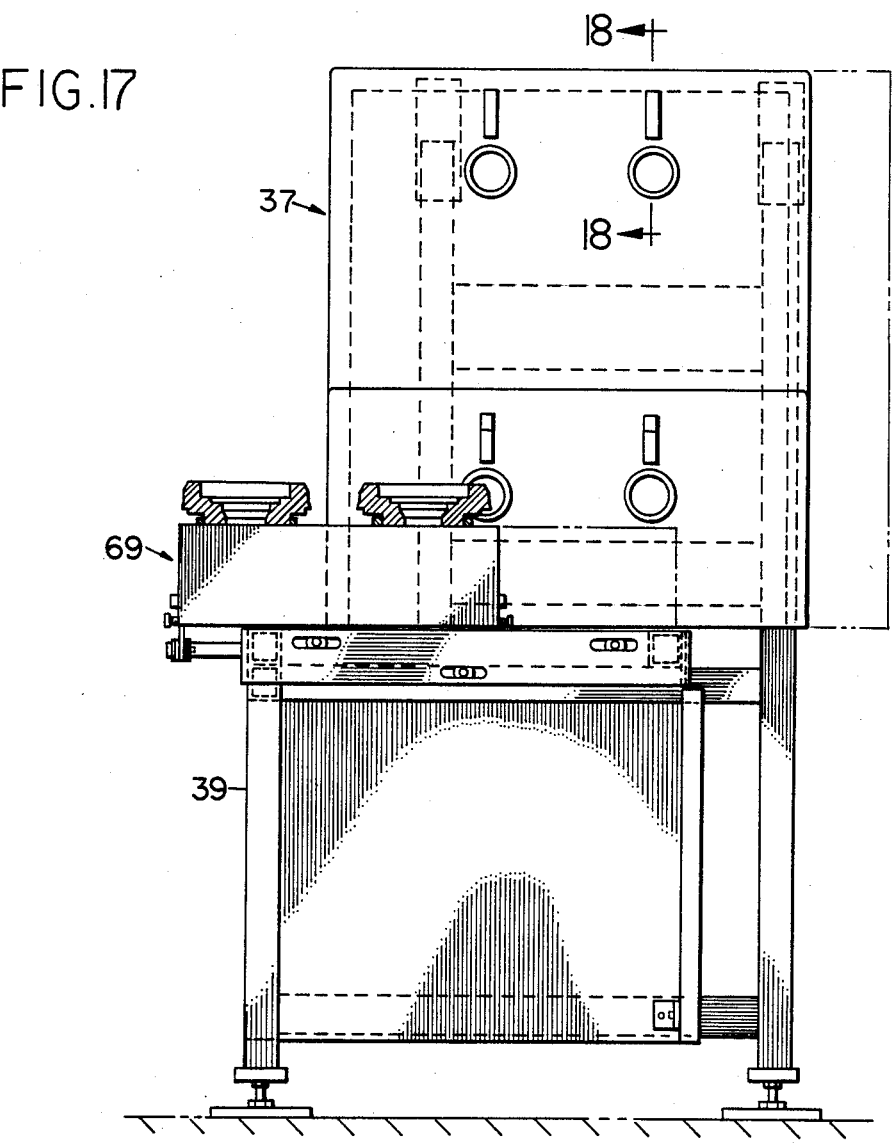
FIG. 17 is a side elevational view of the tool storage matrix and work storage matrix taken in the direction of arrow 17 of FIG. 9.

FIG. 17 is an end view of the base 39 which supports the workpiece support pallet 69 and the tool pocket support table 53.

The work holding gripper chuck 34 depicted in FIG. 9 is indexable through 90 degree increments about the horizontal pivot point 35 so that a workpiece 12 may be deposited on the work support pallet 69.

Tool Grippers

Figure 20:
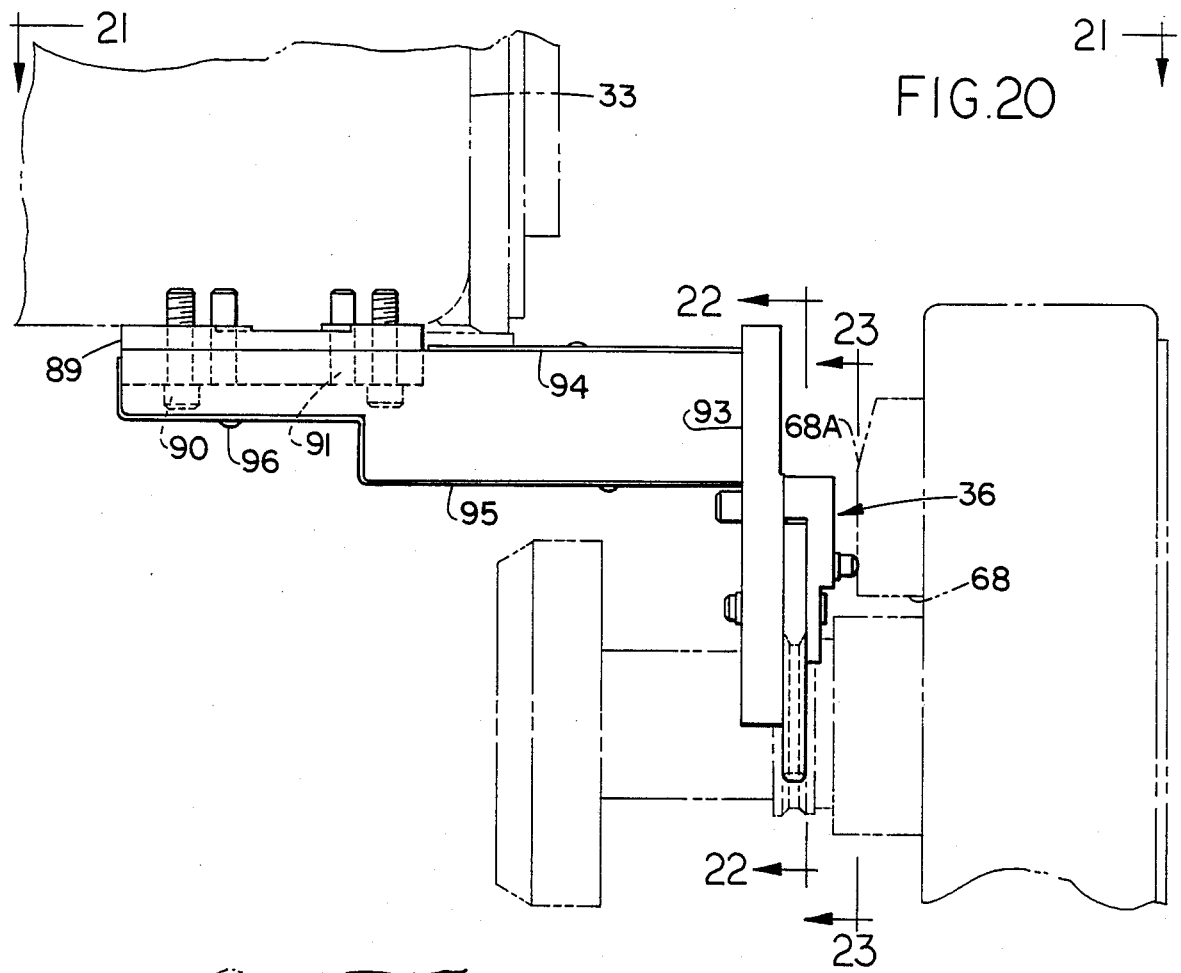
FIG. 20 is an enlarged front view of the tool gripper mechanism of FIG. 1.
Figure 21:
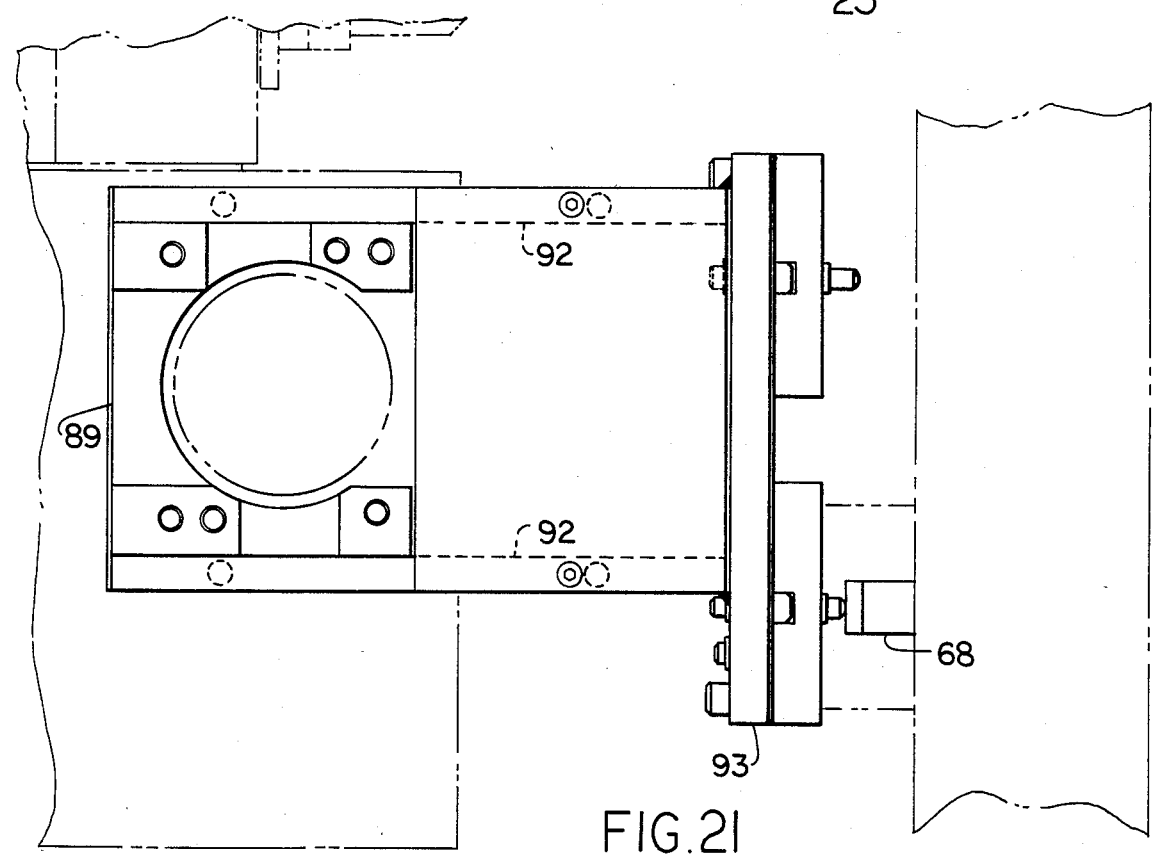
FIG. 21 is a plan view of the tool gripper mechanism taken in the direction of arrow 21 of FIG. 20.

FIG. 20 illustrates the tool grippers 36 wherein the base of the tool grippers 36 is a plate 89 which is secured to the loading head 33 by screws 90 and pins 91. The plate 89 has a pair of side walls 92 which extend beyond the enclose of the loading head 33 and the side walls 92 are welded to a vertical end plate 93. Top and bottom sheet metal covers 94,95 are held to the side walls 92 by button head screws 96, to provide an enclosure for the assembly. The vertical end plate 93 carries a pair of matching grippers 36.

Figure 22:
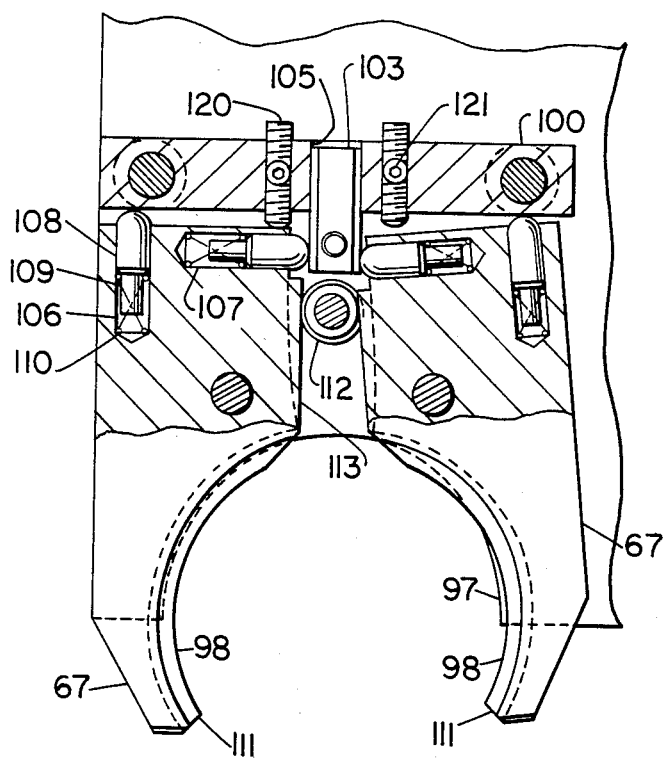
FIG. 22 is a side elevational section, partial section taken through the gripper mechanism along the line 22—22 of FIG. 20.
Figure 23:
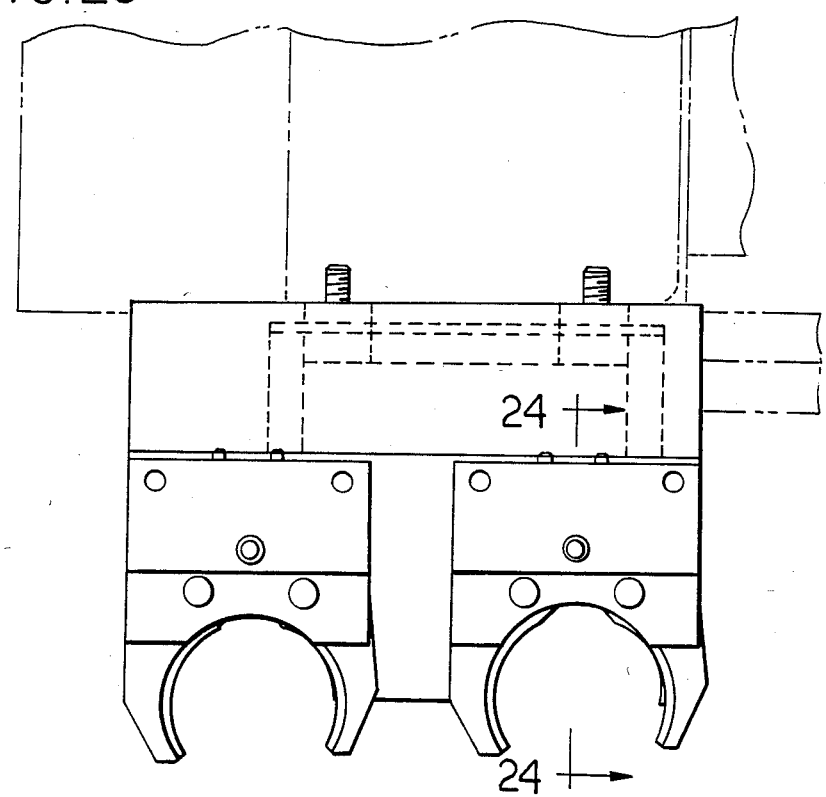
FIG. 23 is an end elevational view of the gripper mechanism taken along the line 23—23 of FIG. 20.

FIG. 23 illustrates that the grippers 36 are mounted side-by-side on the end plate 93. The end plate 93 has a pair of relief diameters 97 machined in the vicinity of the gripping jaws 67 to provide clearance around the tool. As depicted in FIG. 22, the gripper jaws 67 have a beveled arcuate portion 98 disposed around the central axis of the tool to file a tool groove 50, and are pivoted on respective pivot pins 99. The jaws 67 are retained from axial movement with the end plate 93 by means of a front retaining plate 100 which is an inverted L-shaped member held to the end plate 93 by a plurality of cap screws 101. The pivot pins 99 are held by retaining rings 102. A central key block 103 is likewise secured to the end plate 93 by a cap screw 104 and extends upward through a slot 105 in the retaining plate 100. The gripper jaws 67 have vertical and horizontal holes 106,107 in which are received ball nosed pins 108, and a reduced shank 109 on the pin 108 extends into a biasing spring 110 located in each hole 106,107. Therefore, the jaws 67 will be spring-biased to a closed position. The jaws 67 are provided with a taper 111 at the arcuate portion 98 opening so that as they are radially brought to bear against a respective tool gripping diameter, the jaws 67 will spring open and snap around the tool flange. Upon reverse movement the jaws 67 will likewise snap open releasing the tool flange diameter.

In order to avoid the inadvertent opening of the jaws 67 by some external force which may overcome the biasing force of the springs 110 during transport, an interference pin 112 is located between the jaws 67 and is biased to an outward position of interference against the inner flat walls 113 of the jaws 67. The interference pin 112 is received in a counterbore 114 in the end plate 93, and the pin 112 has a central hole 115 which receives a biasing spring 116, where the spring 116 reacts against the counterbore 114 and the hole 115 to drive the interference pin 112 outward. The interference pin 112 has an outboard reduced diameter 117 which is guided through a bushing 118 located in the L-shaped retaining plate 100. The outermost end of the pin 112 has a spherical nose 119 which engages the ramp 68a of the cam block 68 depicted in FIG. 20 during a vertical descent of the loading head 33. Thus, it can be seen that the interference pin 112 will prevent the inadvertent opening of the jaws 67 during transportation of a tool, yet at a tool release site, the vertical movement of the loading head 33 will cause the interference pin 112 to be retracted, thus permitting the jaws 67 to open and close with respect to the tool flange 49.

FIG. 22 shows that a pair of set screws 120 are received vertically through the retaining plate 100 to adjust the final biased position of the respective jaws 67. Additional set screws 121 are received to lock the adjusting set screws 120 in position.

Referring to FIG. 8, the front bearing retainer plate 122 of the front wheelhead 13 is fitted with a cam block 123 which is stationarily held and serves to depress the interference pin 112 of the grippers 36.

FIG. 25 depicts a typical part 12 which may be machined by the grinding wheel tools employed in the present invention, i.e. the fixed grinding wheel tool 23 of the rear wheelhead 22 and the interchangeable grinding wheel tools 24,25 of the front wheelhead 13.

Figure 26E:
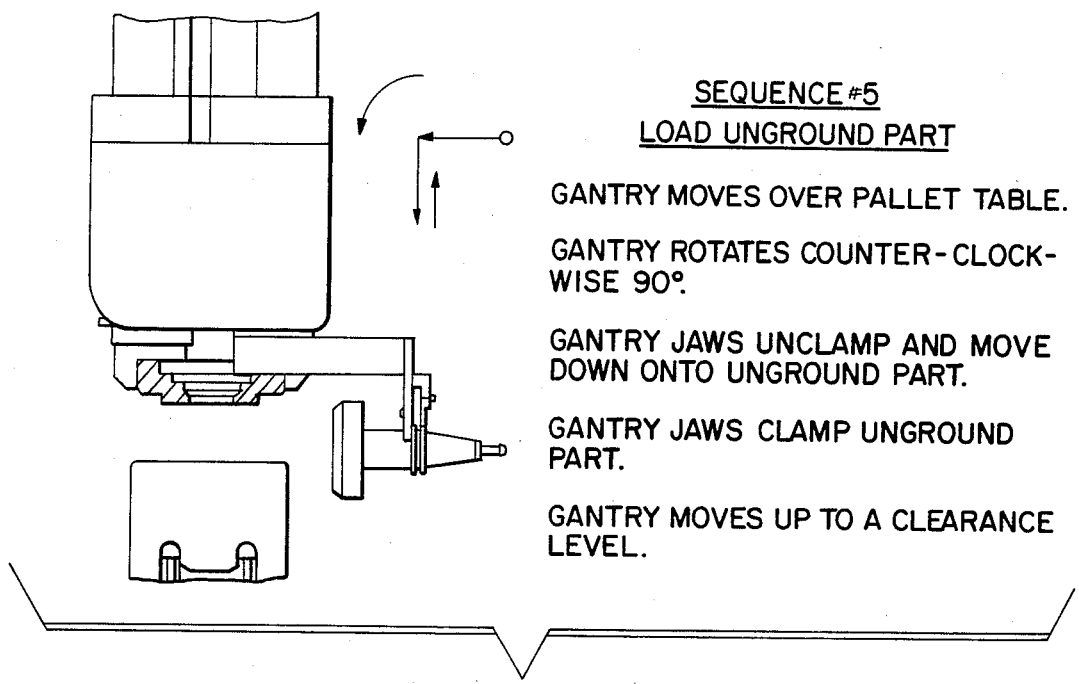
FIGS. 26a–p inclusive, are views illustrating the sequence of operations of the grinding machine.
Figure 26F:
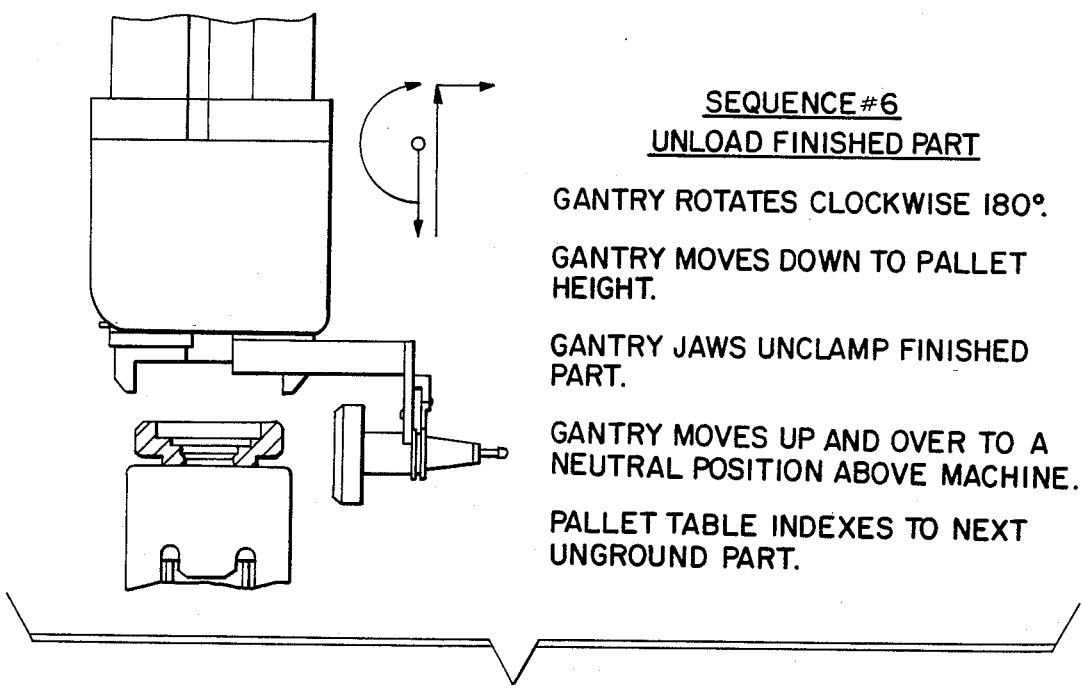
Figure 26G:
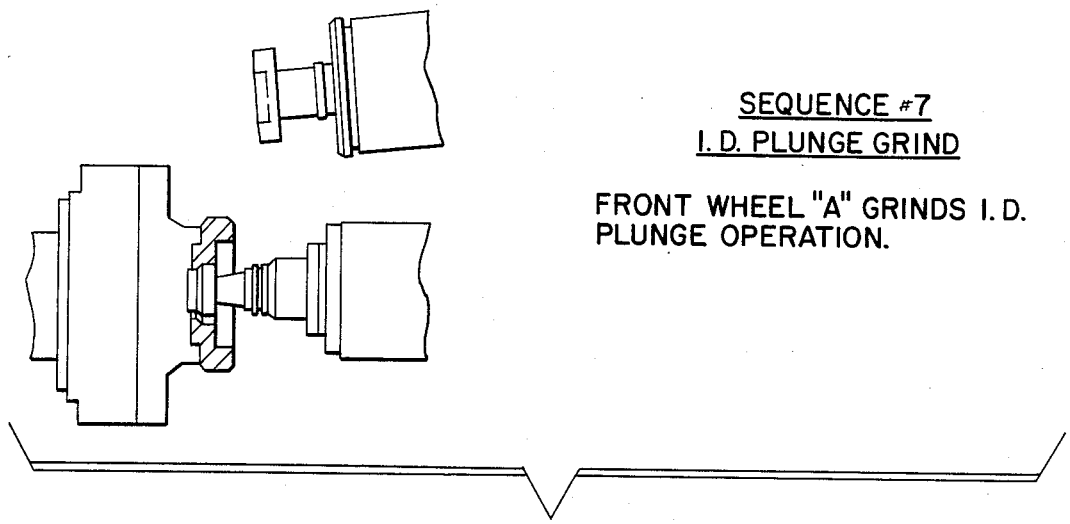
Figure 26H:
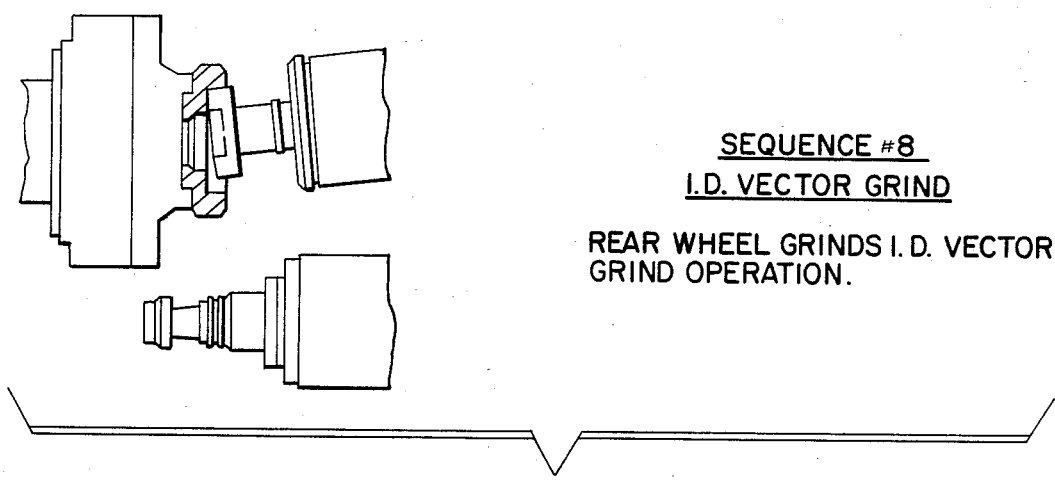
Figure 26I:
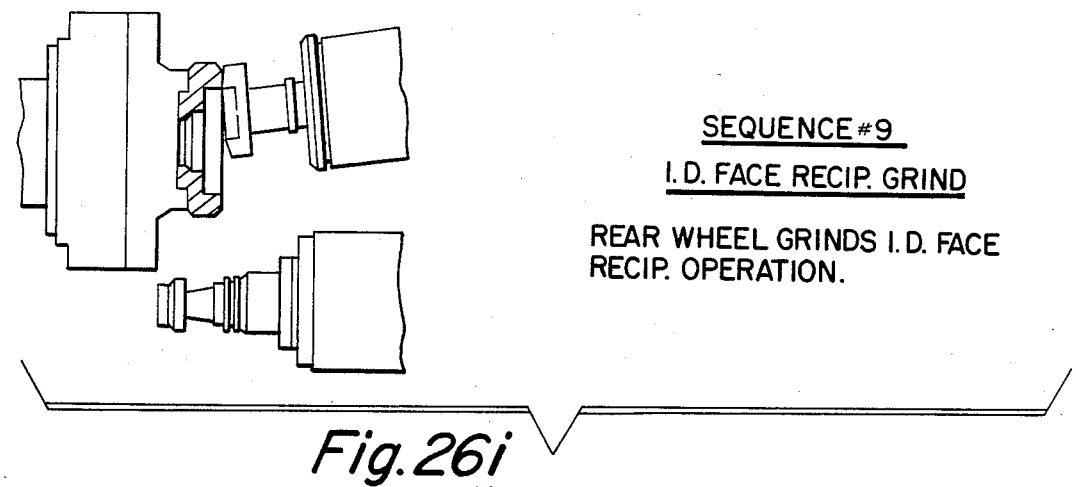
Figure 26M:
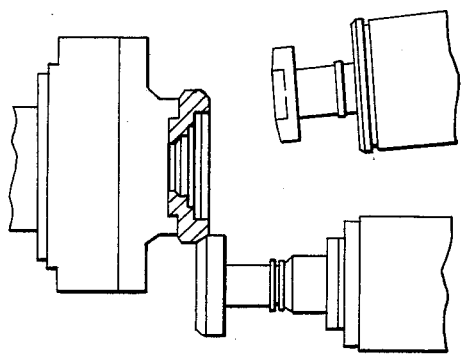
Figure 26N:
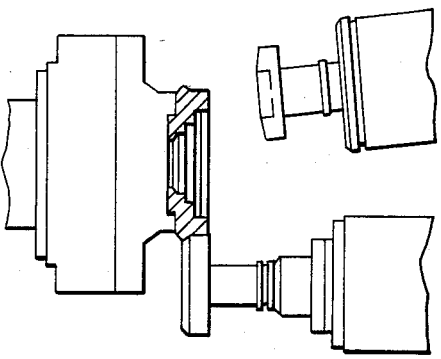
Figure 26O:
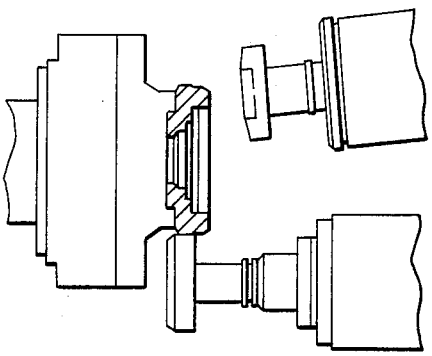

FIGS. 26a–p illustrate the sequence of movements to accomplish part changes through movement of the loading head 33 and rotary movement of the workpiece gripper chucks 34 with respect to the loading head 33, and interchange of grinding wheel tools 24,25 through coordinate movements of the loading head 33 in the Y and Z directions when coordinated with the X movement of the front wheelhead 13 on the machine cross slide 14.

FIGS. 27a and b illustrate the sequence of movements employed to switch from a worn wheel to a sharp wheel stored in the upper and lower tool pockets 54, 35 respectively.

While the invention has been shown in conjunction with a preferred embodiment, it is not intended that the invention be so limited. Rather, the invention extends to all such designs and modifications as come within the scope of the appended claims.

What is claimed is:

1. In a grinding machine having a workhead spindle means for rotatably supporting and driving a workpiece, and having a grinding wheel spindle means for rotatably supporting and driving a grinding wheel tool, an improved device for changing workpieces, wherein the improvement comprises:
  (a) a base frame;
  (b) grinding wheel tool storage means remotely located with respect to said grinding wheel spindle means;
  (c) workpiece staging means remotely located with respect to said workhead spindle means;
  (d) a carriage movable on said frames between a first position proximal said workpiece staging area and a second position proximal said workhead spindle means, and further movable between a third position proximal said grinding wheel tool storage means and a fourth position proximal said grinding wheel tool storage means;
  (e) workpiece gripper means located on said carriage, said workpiece gripper means including means for gripping a rough workpiece and means for gripping a finished workpiece;
  (f) grinding wheel tool gripper means located on said carriage, said tool gripper means including means for gripping first and second grinding wheel tools;
  (g) automatic means for releasably retaining said grinding wheel tool with said grinding wheel spindle means;
  (h) automatic means for releasably retaining said workpiece with said workhead spindle means;
  (i) means for effecting relative movement between said workpiece gripper means and said workhead spindle means for alternately applying said rough and finished workpiece gripping means with respect to said workhead spindle means; and
  (j) means for effecting relative movement between said grinding wheel tool gripper means and said grinding wheel spindle means for alternately applying said first and second grinding wheel tools with respect to said grinding wheel spindle means.

* * * * *